US009162140B2

(12) United States Patent
Gustafson

(10) Patent No.: US 9,162,140 B2
(45) Date of Patent: Oct. 20, 2015

(54) INTERACTIVE BASEBALL SIMULATION BETWEEN REMOTE TEAM MANAGERS

(71) Applicant: James Steven Gustafson, Smyrna, GA (US)

(72) Inventor: James Steven Gustafson, Smyrna, GA (US)

(73) Assignee: Ghostrunner Interactive, LLC, Smyrna, GA (US)

( * ) Notice: Subject to any disclaimer, the term of this patent is extended or adjusted under 35 U.S.C. 154(b) by 139 days.

(21) Appl. No.: 13/864,219

(22) Filed: Apr. 16, 2013

(65) Prior Publication Data

US 2014/0309000 A1    Oct. 16, 2014

(51) Int. Cl.
*A63F 13/00* (2014.01)
*A63F 13/20* (2014.01)
*A63F 13/40* (2014.01)
*A63F 13/98* (2014.01)

(52) U.S. Cl.
CPC .............. *A63F 13/00* (2013.01); *A63F 13/02* (2013.01); *A63F 13/06* (2013.01); *A63F 13/10* (2013.01)

(58) Field of Classification Search
None
See application file for complete search history.

(56) References Cited

U.S. PATENT DOCUMENTS

| 4,261,569 A * | 4/1981 | Frohlich ................... 273/244.2 |
| 8,406,906 B2 * | 3/2013 | Connelly ..................... 700/93 |
| 2005/0077676 A1 * | 4/2005 | Long et al. ................... 273/244 |
| 2009/0069095 A1 * | 3/2009 | Uno ............................... 463/43 |
| 2009/0275371 A1 * | 11/2009 | Takahashi et al. ................ 463/3 |
| 2011/0065489 A1 * | 3/2011 | Fleischman .................... 463/11 |

* cited by examiner

Primary Examiner — James S McClellan
Assistant Examiner — Kevin Carter
(74) Attorney, Agent, or Firm — Sean D. Burdick

(57) ABSTRACT

A method for simulating a game of baseball via a computer network is playable by opposing managers running game application logic at remote computers communicating with an event outcome server. The server executes steps for receiving selected pitcher data and a pitcher control value from a first remote computer, and receiving, for an engagement with the selected pitcher data, selected batter data from a second remote computer. The server optionally modifies the pitcher control value according to the batter data, and generates a first random number for comparison to the pitcher control value. Based on the comparison, the server selects a set of probabilities representing possible outcomes of the engagement, where one selectable set favors the pitcher and another selectable set favors the batter. The server generates a second random number, determines an outcome of the engagement by comparing the second random number to the selected set of probabilities, and transmits instructions to the remote computers for updating status of the game on a visual display according to the outcome of the engagement. Pitcher data, control value, batter data, and probabilities are derived from historical statistics resulting from human performance in major league baseball.

20 Claims, 23 Drawing Sheets

Dugout 1700

Select Starting Pitcher  > Assign Field Positions  > Set Batting Order  > Confirm  > Play Ball!

| Name | Team | Season | Pos1 /Def 1701 | Pos2 /Def 1703 | Pos3 /Def 1705 | Pos5 /Def 1707 | Pos4 /Def 1709 | Assigned? 1708 |
|---|---|---|---|---|---|---|---|---|
| Bench, Johnny | CIN | 1975 | C/Xlnt | 1B/Good | LF/Fair | -/- | -/- | Y |
| Perez, Tony | CIN | 1975 | 1B/Good | -/- | -/- | -/- | -/- | ? |
| Morgan, Joe | CIN | 1975 | 2B/Xlnt | -/- | -/- | -/- | -/- | ? |
| Rose, Pete | CIN | 1975 | 3B/Good | LF/Fair | -/- | -/- | -/- | ? |
| Concepcion, Dave | CIN | 1975 | SS/Xlnt | -/- | -/- | -/- | -/- | ? |
| Foster, George | CIN | 1975 | LF/Xlnt | CF/Elite | RF/Fair | -/- | -/- | ? |
| Geronimo, Cesar | CIN | 1975 | CF/Xlnt | -/- | -/- | -/- | -/- | ? |
| Griffey Sr., Ken | CIN | 1975 | RF/Good | -/- | -/- | -/- | -/- | ? |

1704 — 1706

[X] P  [ ] C  [ ] 1B  [ ] 2B  [ ] 3B  [ ] SS  [ ] LF  [ ] CF  [ ] RF

1702

1710 Auto Set    1711 Profiles    1712 Save    Next

FIG. 17

Dugout 1900

Select Starting Pitcher   > Assign Field Positions   > Set Batting Order   > Confirm   > Play Ball!

1902

Opponent's Starting Pitcher

| Name | Control Rating | Starting Stamina | Hits | PBs | Ks | HRs | WPs | HBPs | BBs | Outs |
|------|----------------|------------------|------|-----|-----|-----|-----|------|-----|------|
| Dickey, R.A. | Elite | 12 | 15 | -- | 15 | 02 | 01 | -- | 03 | 63 |

| Name | Primary Pos | Assigned Pos | Base Running | Speed | Bat Control | Clutch Batting | 1Bs | 2Bs | 3Bs | HRs | Ks | BBs | HBPs | Outs |
|------|-------------|--------------|--------------|-------|-------------|----------------|-----|-----|-----|-----|-----|-----|------|------|
| Gullett, Don | P | P | -- | -- | -- | -- | -- | -- | -- | 02 | 11 | 06 | -- | 65 |
| Bench, Johnny | C | C | Good | Exlnt | Poor | Elite | 17 | 10 | 01 | 07 | 18 | 11 | -- | 36 |
| Perez, Tony | 1B | 1B | Good | Fair | Poor | Exlnt | 21 | 07 | 01 | 05 | 18 | 09 | 01 | 37 |
| Morgan, Joe | 2B | 2B | Elite | Spclist | Good | Exlnt | 23 | 06 | 01 | 04 | 04 | 25 | 01 | 36 |
| Rose, Pete | 3B | 3B | Exlnt | Poor | Exlnt | Elite | 26 | 09 | 01 | 01 | 01 | 12 | 02 | 47 |

1901  1903  1905  1907

| 1 ☐ | 2 ☐ | 3 ☐ | 4 ☒ | 5 ☒ | 6 ☐ | 7 ☐ | 8 ☐ | 9 ☒ |

[Auto Set]   [Profiles]   [Save]   [Next]

FIG. 19

Dugout

> Select Starting Pitcher    > Assign Field Positions    > Set Batting Order    > *Confirm*    > Play Ball!

Away Team

| Terry | | |
|---|---|---|
| New York Mets, 2012 | | |
| Player | Stats | Position |
| Torres, Andres | BR:X, SP:G, BC:F, CB:X | CF(G) |
| Murphy, Daniel | BR:X, SP:X, BC:G, CB:G | 2B(G) |
| Wright, David | BR:G, SP:G, BC:G, CB:X | 3B(X) |
| Davis, Ike | BR:F, SP:P, BC:P, CB:E | 1B(G) |
| Bay, Jason | BR:G, SP:G, BC:P, CB:G | LF(G) |
| Duda, Lucas | BR:F, SP:F, BC:P, CB:X | RF(G) |
| Thole, Josh | BR:F, SP:P, BC:G, CB:G | C(F) |
| Tejada, Ruben | BR:F, SP:F, BC:G, CB:G | SS(X) |
| Dickey, R.A. | MU:E, Stamina:13 | P |

2001

Home Team

| Sparky | | |
|---|---|---|
| Cincinnati Reds, 1975 | | |
| Player | Stats | Position |
| Rose, Pete | BR:X, SP:P, BC:X, CB:E | 3B(G) |
| Morgan, Joe | BR:E, SP:S, BC:G, CB:X | 2B(X) |
| Griffey Sr., Ken | BR:E, SP:G, BC:F, CB:E | RF(G) |
| Bench, Johnny | BR:G, SP:X, BC:P, CB:E | C(X) |
| Perez, Tony | BR:G, SP:F, BC:P, CB:X | 1B(G) |
| Foster, George | BR:G, SP:F, BC:F, CB:E | LF(X) |
| Concepcion, Dave | BR:X, SP:E, BC:G, CB:G | SS(X) |
| Geronimo, Cesar | BR:X, SP:G, BC:P, CB:G | CF(X) |
| Gullett, Don | MU:E, Stamina:13 | P |

2002

> Play Ball!    2003

FIG. 20

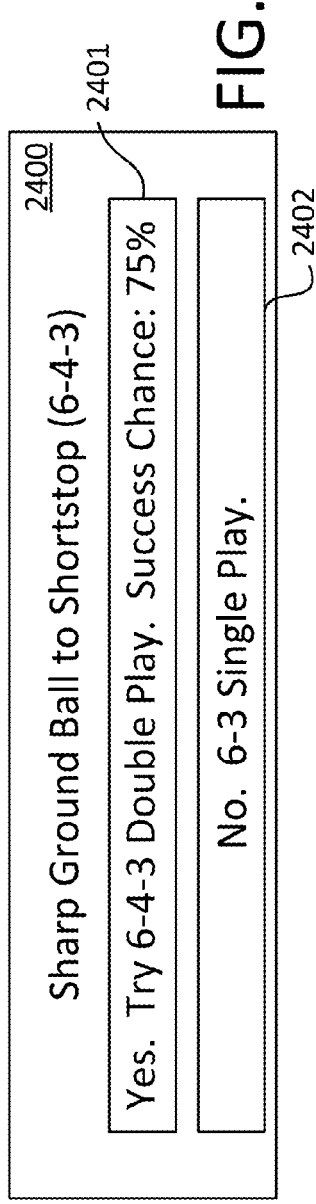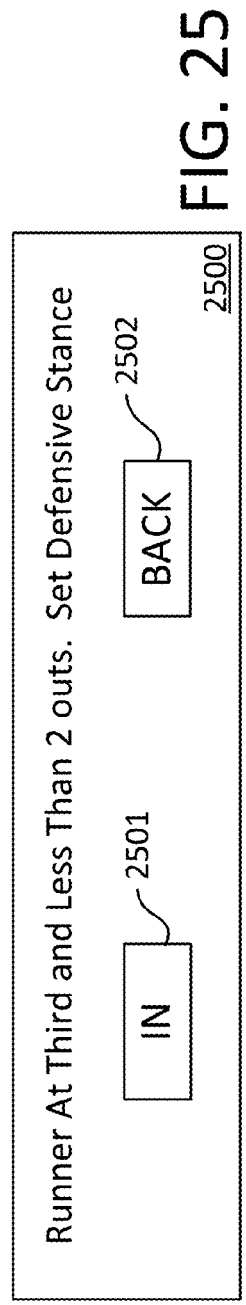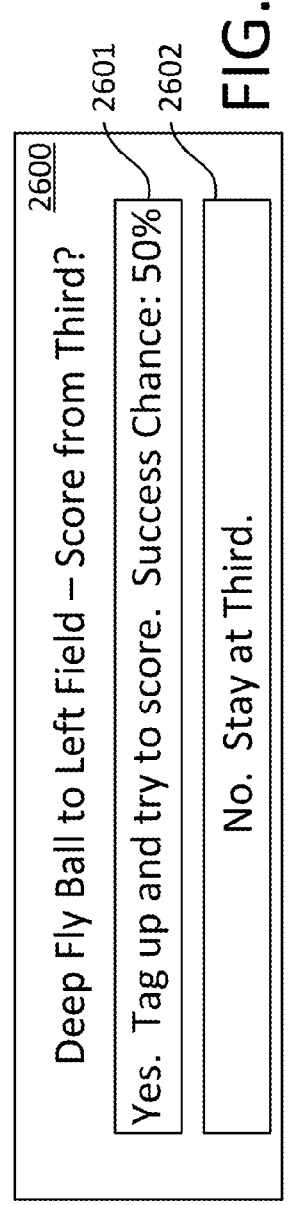

Triple to Center!
Batter Safe At Third.
FIG. 27
Line Drive!
Line Drive to Second. Batter Out.
FIG. 28
Ball Four!
Batter Takes His Base.
FIG. 29
Strike Three!
Batter Strikes Out.
FIG. 30
Game Over
3100
 Away Team:  New York, 2012   Runs: 1   Hits: 4    Errors: 2
 Home Team:  Cincinnati, 1975   Runs: 5   Hits: 11   Errors: 0
FIG. 31

INTERACTIVE BASEBALL SIMULATION BETWEEN REMOTE TEAM MANAGERS

This application claims priority to U.S. Provisional Application 61/624,961, which was filed on Apr. 16, 2012, and which is fully incorporated herein by reference.

BACKGROUND OF THE INVENTION

1. Field of the Invention

The present invention relates generally to computer games, more specifically to a computer simulation of a baseball game, and most specifically to a computerized baseball game wherein events that determine the course of the game are influenced by discrete interactions between managers of opposing teams through decisions input to a game server through digital transmissions from the managers' remote computing devices.

2. Description of Related Art

Baseball simulation games probably date back to the late nineteenth century, a few decades after the real game of baseball had established itself as America's pastime. The earliest simulations arose out of necessity in vacant lots frequented by American youths, who adapted rules on the fly to cope with every circumstance—rules that were limited only by their unbounded imaginations. When short of the requisite number of players needed to man each of the nine positions on the baseball diamond, rules were created to make up for such deficiencies, e.g., the ubiquitous "ghost runner" would replace a runner on the base paths who was needed at the plate. Ground rules would be established to transform unlikely sites—city blocks, corn fields, streets and alleys—into baseball diamonds, so that a tree, a fire hydrant, or a patch of weeds could serve as third base. Players would be selected for each team by self-appointed captains, who would vie for the first pick according to the "eagle claw" ritual in which one captain would toss a baseball bat to the other with the knob oriented upward. The opposing captain would catch it with one hand to establish an initial grip, and each would place alternating grips at higher locations, hand over hand, until at last the winning captain was able to clasp the knob at the top and claim the first pick.

Indoor simulations and parlor games soon followed. For example, a standard deck of playing cards could be adapted for a baseball simulation game by assigning various outcomes to an at-bat according to a random draw from the deck, e.g. and ace denotes a single, a deuce a double, etc. A variety of mechanical baseball games and board games were also developed in the twentieth century, and are far too numerous for elaboration. Three, in particular, are worthy of further study, for incorporating the names of real-life major league ballplayers into a baseball simulation game, and for using real-life statistics compiled during the careers of these players as the basis for establishing probabilities to determine the outcome of simulated baseball events.

The first of these was patented in 1925 by Clifford A. Van Beek of Green Bay, Wis. as U.S. Pat. No. 1,536,639 and eventually marketed under the name National Pastime. Van Beek's game simulated baseball through a series of player cards and play sheets. Each player card listed a table of numbers that simulated a corresponding real player's statistical performance, and each play sheet listed various possible outcomes for a particular event that could arise during the course of a game. A standard pair of six-sided dice were used to resolve events on a play sheet according to the numbers shown on the cards of the players involved in the event. Events and game play involved batting and fielding probabilities only, without influence from pitching statistics.

The second was a baseball simulation game developed in the 1930s in Lancaster, Pa. by Dick Seitz, who was inspired by the work of Van Beek. Seitz's game, which he called APBA Baseball, incorporated playing cards, on-field statistics of major league players, a board to represent the playing field, and standard six-sided dice to generate random numbers to resolve outcomes. The APBA game was eventually computerized in the 1980s, and published by McGraw-Hill for play on a Microsoft Windows platform. Game play is limited in that the events and outcomes are based on plate-appearances, as opposed to pitch-by-pitch.

A third game, All-Time All-Star Baseball published in 1971 by Time, Inc. and Sports Illustrated, featured tri-fold charts that included real player statistics for each of 20 major league baseball teams. A special set of three six-sided dice with results ranging from 10 through 39 were used to resolve events determined for each pitcher and batter. Though based on real life statistics, the pitcher outcomes were determined independently and in advance of the batter outcomes. The game was later released by Avalon Hill as Superstar Baseball with the tri-fold charts replaced by individual player cards based on the 25 best players from the history of each National League and American League team. Printed on each player card were outcome tables for each possible roll of the dice. The latest version included a four-part folding game board displaying a baseball diamond with locations for placing the cards for pitchers and batters that were involved in each at-bat, as well as special outcome tables involving wild pitches, stolen base attempts, sacrifice bunts, and advancing runners on fly balls, that added additional managerial decision components to the game.

With the advent of video games, manually operated baseball simulation games such as these have declined immensely in popularity. And while video games for home systems such as MLB® 12 (Sony) and MVP Baseball (EA Sports) represent a certain state of the art, such systems with all their advanced features have certain drawbacks. For one, the systems are designed for interactive play against video graphics operated by a computer or by another human player. The games are therefore not suited for portability or remote play, because they require a video monitor and a specialized game console and controller. For another, in order for two players to participate, each needs to be in the same location and equipped with controllers designed for that particular system. But perhaps the biggest drawback is that regardless of the extent to which real-life statistics are introduced into the gaming code, the outcome of baseball events are dependent largely on the skill of the human player and his experience manipulating the controls of the particular gaming system. The video games are thus player-centric, and fail to capture accurately the experience of acting as a big-league manager who plays an entirely mental or intellectual game.

SUMMARY OF THE INVENTION

The foregoing limitations in the present state of the art in baseball simulation games are addressed by the present invention, which provides a Simulated Baseball game playable in discrete steps by remote managers who affect game play in a purely intellectual manner. In one embodiment, the invention may be practiced on a computer network having an event outcome server communicating with remote computers, where each remote computer is manipulated by a manager participating in game play against one another. Each manager may operate a remote computer of his liking, provided that it can support and execute application software for the Simulated Baseball game and communicate with the event outcome server.

In this system, a basic method for simulating a game of baseball playable by managers at the remote computers comprises steps of (a) receiving selected pitcher data and a pitcher control value via the computer network from a first one of the remote computers; (b) receiving, for an engagement with the selected pitcher data, selected batter data via the computer network from a second one of the remote computers; (c) modifying the pitcher control value according to the batter data; (d) generating a first random number; and (e) comparing the first random number to the modified pitcher control value. In step (f), if the first random number is not greater than the modified pitcher control value, a step is provided for selecting a set of pitcher probabilities representing possible outcomes of the engagement that generally favor the pitcher, thereby awarding control of the engagement to the pitcher. In step (g), if the first random number is greater than the pitcher's control value, a step is provided for selecting a set of batter probabilities representing possible outcomes of the engagement that generally favor the batter, thereby awarding control of the engagement to the batter. Subsequent steps are provided for (h) generating a second random number; (i) determining an outcome of the engagement by comparing the second random number to the selected set of probabilities; and (j) transmitting instructions to the first and second remote computers for updating status of the game on a visual display according to the outcome of the engagement. Generally, steps (a) through (j) are salient steps of the method that are encoded as a series of instructions stored in memory and executable by a processor within the server.

In a particular embodiment, within the foregoing method, the modifying step may or may not generate the modified pitcher control value. In one case, a lower value is generated as the modified pitcher control value if the selected pitcher data indicates a hates-to-face relationship with respect to the selected batter data. In another case, a higher value is generated as the modified pitcher control value if the selected pitcher data indicates a loves-to-face relationship with respect to the selected batter data. The loves-to-face and hates-to-face relationships between particular matchups of pitchers and batters simulates historical outcomes wherein, general performance records of the pitcher and batter prove unreliable as an outcome predictor, and a more realistic prediction may be obtained by specific performance records that involve engagements limited to the particular pitcher versus the particular batter.

In more elaborate embodiments of the invention, managers may invoke strategy options in an attempt to bypass the possibility of the opposition gaining control of the engagement. Managers may invoke strategy options such as an intentional walk, a stolen base attempt, a hit-and-run attempt, and a clutch batting attempt. In such cases, the method determines, prior to the modifying step, whether a manager strategy option has been received from at least one of the remote computers, and if so, bypassing steps (d) through (i), and resolving the manager strategy option prior to step (j).

In one embodiment the manager strategy option comprises an intentional walk command received from the first remote computer, and the resolving step comprises advancing a batter to first base.

In another embodiment, the manager strategy option comprises a stolen base attempt, and resolving the manager strategy option further comprises receiving catcher defensive data via the computer network from the first remote computer, receiving baserunning and speed data via the computer network from the second remote computer, determining a set of base stealing probabilities for resolving the stolen base attempt based on the retrieved catcher defensive data and on the retrieved baserunning and speed data, generating a third random number, and determining the outcome of the stolen base attempt by comparing the third random number to the set of base stealing probabilities.

In another embodiment, the manager strategy option comprises a hit-and-run attempt, and resolving the manager strategy option further comprises receiving bat control data and speed data via the computer network from the second remote computer, determining a set of hit-and-run probabilities for resolving the hit-and-run attempt based on the retrieved bat control data, generating a fourth random number, and determining the outcome of the hit-and-run attempt by comparing the fourth random number and the speed data to the set of hit-and-run probabilities.

In another embodiment, the manager strategy option comprises a clutch batting attempt, and resolving the manager strategy option further comprises receiving clutch batting data via the computer network from the second remote computer, determining a set of clutch batting probabilities for resolving the clutch batting attempt based on the retrieved clutch batting data, generating a fifth random number, and determining the outcome of the clutch batting attempt by comparing the fifth random number to the set of clutch batting probabilities.

BRIEF DESCRIPTION OF THE FIGURES

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

FIG. 17 shows one example of a display rendered on a user interface for prompting a manager to select position players from a list of players available for game play according to the invention.

FIG. 19 shows one example of a display rendered on a user interface for prompting a manager to create a batting order from players selected for the starting lineup in game play according to the invention.

FIG. 20 shows one example of a display rendered on a user interface for providing a manager with confirmation of lineup selections prior to commencing game play according to the invention.

FIG. 24 shows one example of a display rendered on a user interface for presenting an event outcome with defensive strategy options according to the invention.

FIG. 25 shows one example of a display rendered on a user interface for presenting a game status with defensive strategy options according to the invention.

FIG. 26 shows one another example of a display rendered on a user interface for presenting an event outcome with offensive strategy options according to the invention.

FIGS. 27-30 show various examples of displays rendered on a user interface of a remote device for presenting event outcomes according to the invention.

FIG. 31 shows one example of a display rendered on a user interface of a remote device for presenting final results of a baseball simulation game according to the invention.

DETAILED DESCRIPTION OF THE INVENTION

Figure 1:
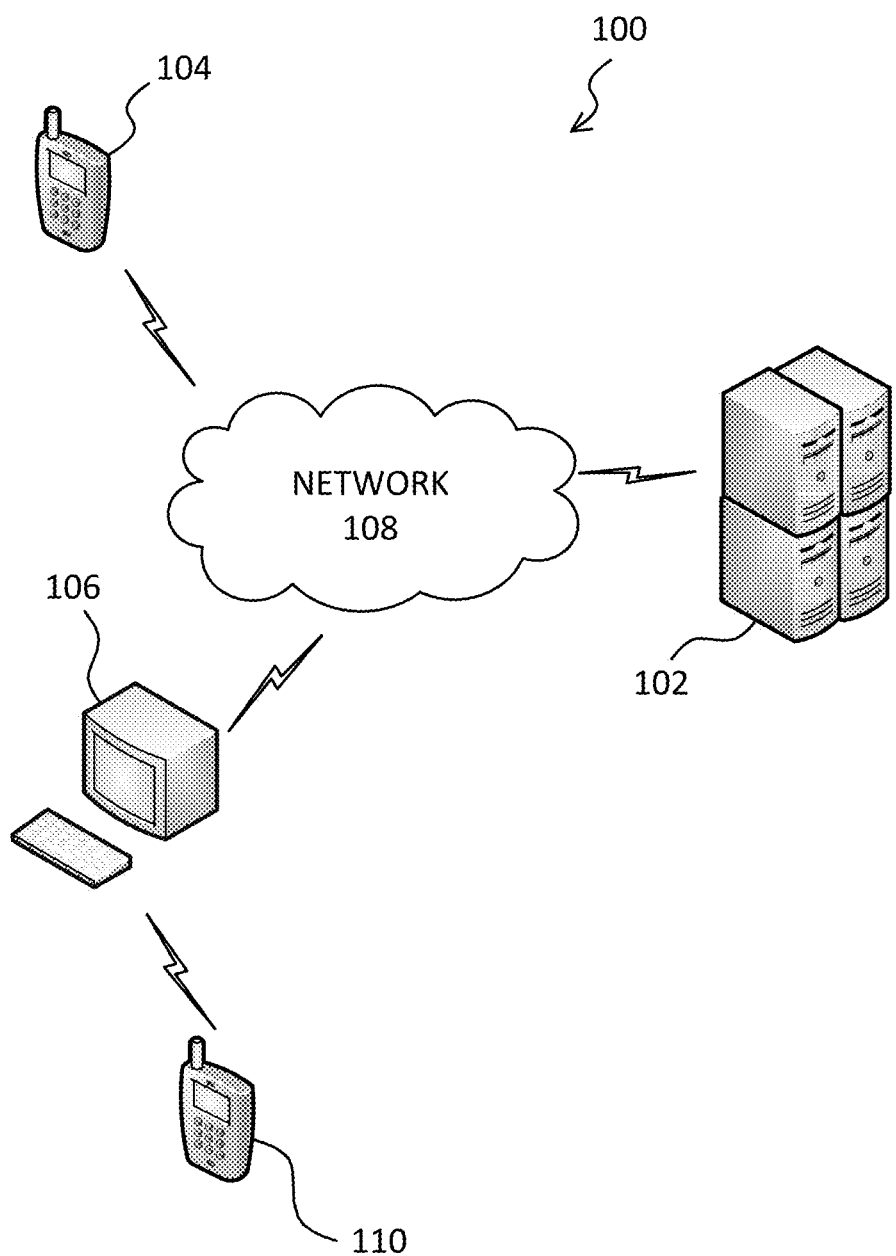
FIG. 1 is a block diagram showing a system according to the invention that includes remote computing devices communicating via a network with an event outcome server for simulating a game of baseball.

This disclosure presents an exemplary embodiment of the invention for simulating a baseball game between remote participants who act as managers of their respective teams. Techniques disclosed herein enable one or more individuals to play an intellectual game of baseball from a manager's perspective, play by play or pitch by pitch, without having to be in the same location at the same time. Advantageously, each manager can play the game using his own computing device on any platform that can execute baseball simulation software according to the invention, and interface with an event outcome server, for example, over the Internet. Hereinafter, a computer simulated baseball game according to the invention may be referred to as "Simulated Baseball".

INTRODUCTION

Simulated Baseball is a simulation of Major League Baseball, played by two or more players, each playing preferably on a mobile communication device (iPhone, Blackberry, Droid, etc.), though play may be effected on stationary computing devices as well. Hereafter, references to actions associated with mobile computing devices are equally applicable to computing devices in general. Each game player controls a team of their own creation or selection, composed of statistical models of actual major league players. These statistical models represent the major leaguers that each manager has selected (or drafted) to compose their team. Hereinafter, game players may be referred to as "managers" to distinguish them from the baseball players who make up each manager's team.

During the course of playing a given game, the game players or managers are regularly prompted on their mobile devices to make decisions and choose options about how their players will execute the play in progress. For example, a batter might hit a ground ball to the shortstop with a runner on first base. In this instance, the mobile device of the defensive manager will prompt him with a video display to decide whether to attempt a double play. Since his decision will be influenced by the defensive abilities of his shortstop and second baseman, as well as the speed of the base runner, his mobile device will also display the likelihood of success of the double play attempt. This "interactive" element of Simulated Baseball is a unique property of the game that differentiates it from the myriad of other typical "baseball simulation" games.

The statistical model of a player is derived from their actual Major League performance (their baseball statistics) for the specific season under which they have been drafted (Barry Bonds—2001, for example). For non-pitchers, the statistical model includes a breakdown of their likelihood to: get a hit (either an infield hit, a single to any outfield, a double to any outfield, a triple, or a home run), get a walk, get hit by a pitch, strikeout, or make an out of any type. Their statistical model also includes their RATINGs for specific STRATEGY OPTIONs that can be invoked by the manager during the course of a game. The ratings are: BASERUNNING, SPEED, BAT CONTROL, and CLUTCH HITTING. As well, the statistical model of a given player includes the defensive position(s) that he is eligible to play, together with his DEFENSIVE RATING(s) at those position(s). Finally, a player's statistical model includes at least two pitchers that he LOVES TO FACE and HATES TO FACE, respectively.

Similarly, a pitcher's statistical model is also derived from their actual Major League statistics from the season under which they has been drafted (Greg Maddux—1995, for example). However, the data differs as follows: pitcher ratings include the likelihood of: giving up a hit (infield hit, single to any outfield, or home run), giving up a walk, hitting a batter, throwing a wild pitch, throwing a passed ball, striking out the batter, or getting the batter out (via a fielded ball). Although a pitcher's statistical model does not include a batter's STRATEGY OPTIONS, it does include two ratings that are unique to pitchers: CONTROL RATING and STAMINA RATING. A pitcher's statistical model also includes a designation of that pitcher as a starter, reliever, or two-way pitcher (i.e. one who can play as either a starter or a reliever), but no DEFENSIVE RATING is utilized for a pitcher. Finally (as with non-pitchers), the pitcher's statistical model includes at least the two batters that he LOVES TO FACE and HATES TO FACE, respectively.

During the course of playing a game, each manager selects a team, creates a batting order, and populates each defensive position, all with names of major leaguers from the team's roster. As in actual baseball, there must be nine positions populated (pitcher, catcher, first baseman, second baseman, third baseman, shortstop, left fielder, center fielder, and right fielder) and each defensive player in the line-up must come to bat in a set order. If the managers decide to observe American League rules, then they may substitute a "designated hitter" to bat for anyone in the lineup. This substitution does not force the defensive player to be removed from the game.

System

As indicated above, Simulated Dice Baseball is designed for two or more players to play from their respective remote computing devices. Generally, the simulation will involve one manager against another, but more elaborate embodiments of the invention may include league or tournament play involving more than two players. It is further contemplated that Simulated Baseball could be played by multiple managers in an all-star format in which each manager controls the individual pitching, running, fielding and hitting decisions that involve his particular players.

In a preferred embodiment of a system according to the invention for realizing Simulated Baseball, managers engage one another in peer-to-peer game play over a system of networked computers. Regardless of the number of managers involved, Simulated Baseball in one embodiment may be centrally controlled by an event outcome server. For example, each participating manager may sign on to the event outcome server using a secure sign-on protocol known in the art to enable communications between each manager's remote computing device and the event outcome server. Preferably, each remote computing device runs the Simulated Baseball game application software locally, displays the state of the game, responds to manager inputs, communicates manager decisions to the event outcome server, receives responsive outcomes from the event outcome server, and displays the results of event outcomes on the remote computing devices to update the state of the game and to prompt each manager for his next decision.

Although it is possible within the scope of the invention to run the game application software on the server, and send rendering instructions, etc. to each mobile device, this would place an enormous processing burden on the server when large numbers of managers sign on to play the game. By delegating execution of the game application software to the individual mobile devices, the event outcome server is better able to serve a large population of users. In this sense, the event outcome server may be though of as a "virtual umpire" whose primary purpose is to coordinate game play between sets of opposing managers and resolve Simulated Baseball events.

As seen in FIG. 1, a Simulated Baseball system 100 includes, for example, an event outcome server 102 and computing devices 104 and 106, which are both connected by a network 108. The network 108 can be, for example, the Internet, a telephone network, a wide area network, a local area network, or any combination thereof. In one embodiment, the system 100 can facilitate secure communication between and among the event outcome server 102 and the computing devices 104 and 106. The secure communication can include, for example, transmission of data, or a completion of a transaction. Although very few computing devices are depicted in FIG. 1, this is done for illustrative purposes only. It should be understood that a system including very large numbers of computing devices, particularly mobile computing devices, communicating game play scenarios to the even outcome server 102, is well within the wheelhouse of the invention.

The Simulated Baseball game application software may be downloaded or otherwise installed on a manager's remote computing device 104 or desktop computing device 106, using techniques well known in the art. The application software includes all computer-readable instructions needed to present Simulated Baseball as described herein to run on a computing device in an interactive manner to simulate a game of baseball between two or more managers. That is, the application software displays the game state on the manager's device 104 or 106 in visual form, and may include the display of a graphical user interface through which a manager may communicate decisions for game play. Such decisions include all decisions described herein, such as setting a lineup, selecting a pitch, selecting a batting strategy, etc. The application software also communicates with the event outcome server 102 to advance game play by transmitting manager decisions thereto, and by receiving event outcomes therefrom. It is contemplated that additional remote computing devices such as device 110 may run the application software and communicate with the event outcome server through an intermediate computing device 106 acting for example as a router or local area network server.

Figure 2:
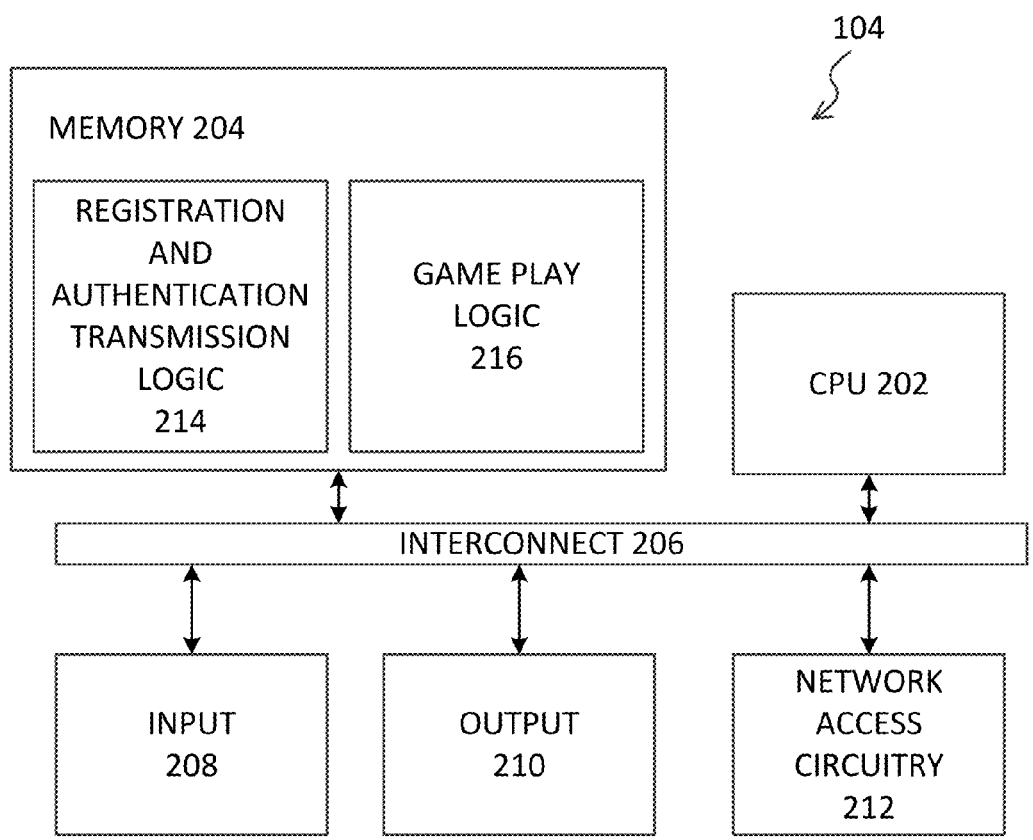
FIG. 2 is a block diagram showing functional components that make up a remote computing device according to one embodiment of the present invention.

FIG. 2 represents a computing device 104 in further detail. The description of computing device 104 applies equally to devices 106 and 110. The computing device 104 may include, for example, one or more microprocessors, which are collectively shown as CPU 202. The computing device 104 may also include, for example, a memory 204, an interconnect 206, an input 208, an output 210, and a network access circuitry 212. The CPU 202 can retrieve data or instructions from the memory 204 and execute the retrieved instructions. The memory 204 can include generally any computer-readable medium including, for example, persistent memory such as magnetic or optical disks, ROM, and PROM and volatile memory such as RAM.

The CPU 202 and the memory 204 are connected to one another through the interconnect 206, which is a bus in this illustrative embodiment. The interconnect 206 connects the CPU 202 and the memory 204 to the input devices 208, the output devices 210, and the network access circuitry 212. The input devices 208 can include, for example, a keyboard, a keypad, a touch-sensitive screen, a mouse, a microphone, or one or more cameras. The output devices 210 can include, for example, a display—such as a liquid crystal display (LCD)— or one or more loudspeakers. The network access circuitry 212 sends and receives data through computer networks such the network 106.

A number of components of the computing device 104 are stored in the memory 204. In particular, a registration and authentication transmission logic 214 may be a software module or part of one or more computer processes executed within the CPU 202 from the memory 204 in this illustrative embodiment, but can also be implemented using digital logic circuitry. As used herein, "logic" refers to (i) logic implemented as computer instructions or data within one or more computer processes or (ii) logic implemented in electronic circuitry.

In one embodiment, the registration and authentication transmission logic 214 is executable software stored within the memory 204. For example, the registration and authentication transmission logic 214 can transmit registration information or authentication information responsive to receiving a registration information request or an authentication information request from the event outcome server 102. Such logic is executed, for example, when first registering a manager for game play on system 100, or for authenticating a previously registered manager who wishes to access secure files or continue a game in progress. Registration and authentication methods are well known and are not further described herein.

Game play logic 216 may also comprise an executable software module stored within memory 204. Game play logic includes the game application software that enables Simulated Baseball to run on the computing device 104. The game play logic 216 includes all instructions for displaying the state of the game, for displaying graphical user interfaces that prompt a manager for decisions, for communicating decisions and receiving results from the event outcome server through network access circuitry 212, and for displaying other data or performing calculations necessary to facilitate play according to the procedures described herein when running on the platform of device 104.

Figure 3:
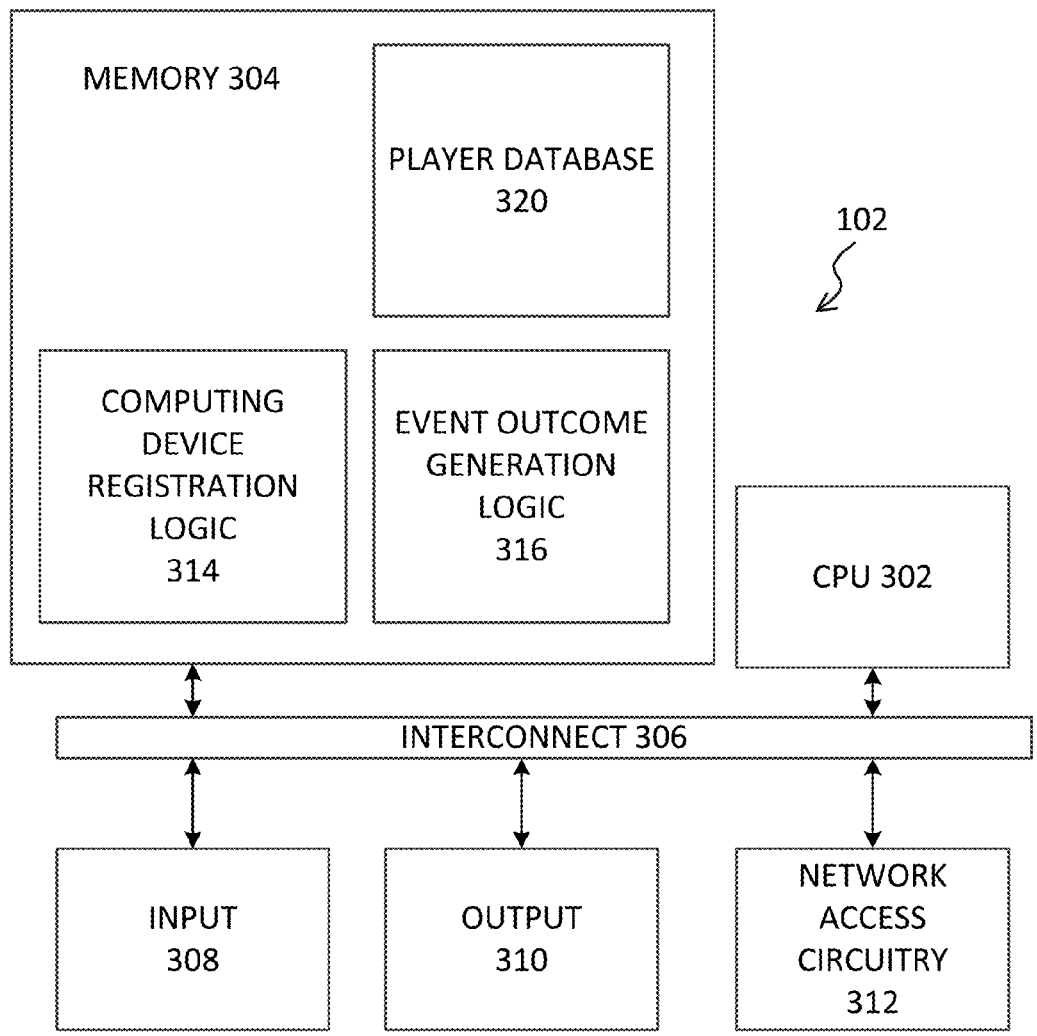
FIG. 3 is a block diagram showing functional components that make up an event outcome server according to one embodiment of the present invention.

One example of an event outcome server 102 can be seen in FIG. 3. The event outcome server 102 can include, for example, one or more microprocessors, which are collectively shown as CPU 302. The event outcome server 102 may also include a memory 304, an interconnect 306, an input 308, an output 310, and/or a network access circuitry 312. The CPU 302 can retrieve data or instructions from the memory 304 and execute the retrieved instructions. The memory 304 can include generally any computer-readable medium including, for example, persistent memory such as magnetic and/or optical disks, ROM, and PROM and volatile memory such as RAM.

The CPU 302 and the memory 304 are connected to one another through the interconnect 306, which is a bus in this illustrative embodiment. The interconnect 306 connects the CPU 302 and the memory 304 to the input devices 308, the output devices 310, and the network access circuitry 312. The input devices 308 may include, for example, a keyboard, a keypad, a touch-sensitive screen, a mouse, a microphone, and one or more cameras. The output devices 310 can include, for example, a display—such as a liquid crystal display (LCD)—and one or more loudspeakers. The network access circuitry 312 sends and receives data through computer networks such the network 106.

A number of components of the event outcome server 102 are stored in the memory 304. In particular, a computing device registration logic 314 is part of one or more software modules or computer processes executed within the CPU 302 from the memory 304 in this illustrative embodiment, but can also be implemented using digital logic circuitry. Computing device registration logic 314 may be executed by CPU 302 to register remote computing devices of managers who sign on to play the Simulated Baseball game, and to authenticate previously registered managers who sign on after registration to draft players, challenge other managers to new games, or to continue games in progress. Memory 304 may also include a player database 320, which contains the names of players, their associated statistics and probabilities applicable to various game play events, and information on rosters compiled for each registered manager. In another embodiment, the roster information may be stored locally in memory 204 on each remote computing device. Player database 320 may also include data on historical box scores from simulated game play, league standings, schedules, etc.

In a preferred embodiment, the player database 320 is populated with the names of real-life major league baseball players, past and present. In addition, the various probabilities that are associated with each player name are derived from real-life performance statistics, using methods according to the invention. In one embodiment, probabilities are derived on a seasonal basis, that is, according to a particular year in which the associated real-life baseball player compiled the statistics. For example, player data may be compiled for Ted Williams 1941, Sandy Koufax 1965, etc.

Event outcome generation logic 316 may also comprise a software module stored in memory 304. Logic 316 comprises all series of instructions necessary for resolving game events created by the interaction of opposing managers communicating with the event outcomes server 102 during the course of game play. These events include, for example, all such events described herein. The outcomes of the events may be logged in the memory 304 and communicated by CPU 302 to the active remote computing devices via the network access circuitry 312. Event outcome generation logic 316 includes, among other algorithms, random number generation logic.

Figure 4A:
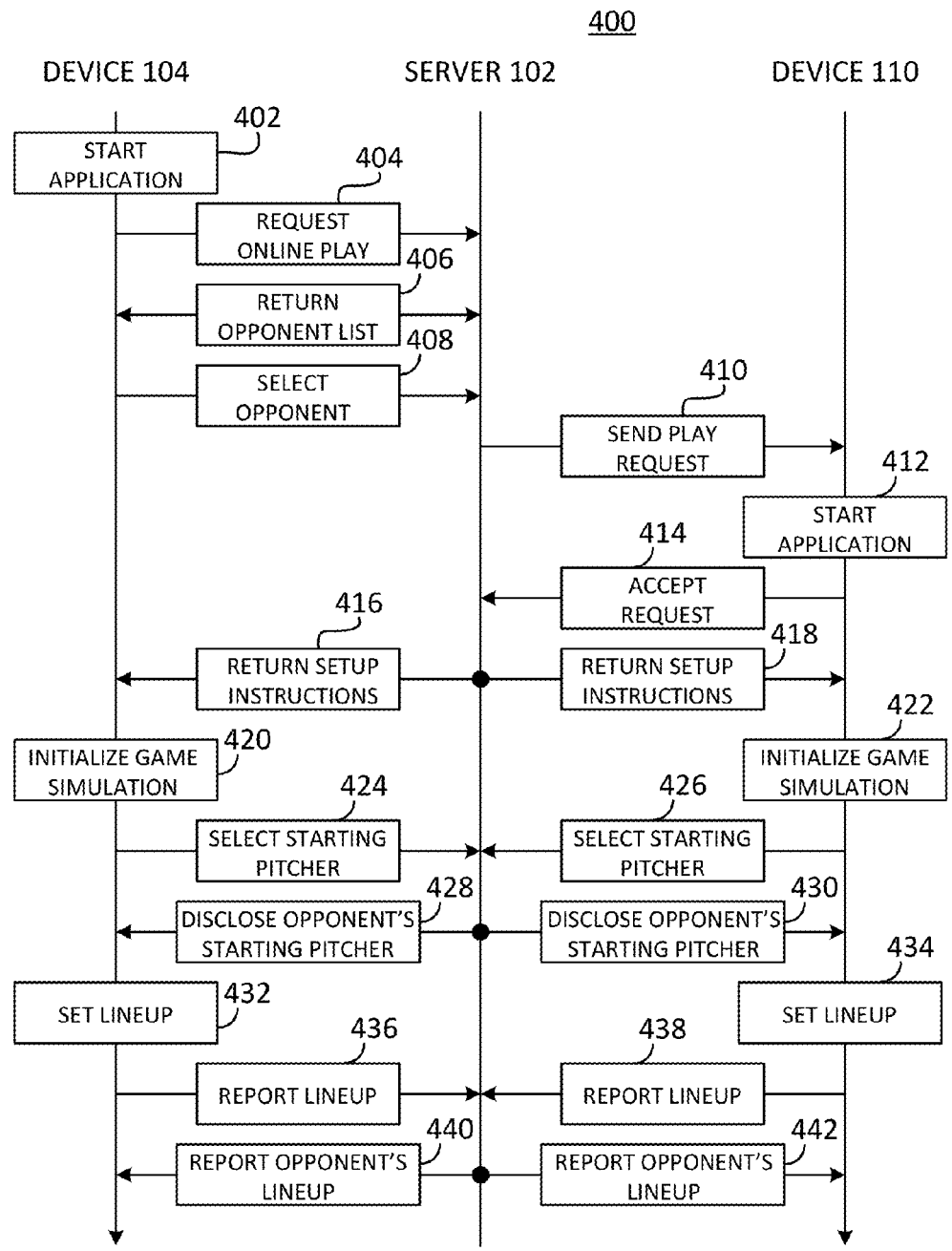
FIG. 4A is the first part of a process flow diagram according to one embodiment of the invention illustrating steps for initializing game play between two remote devices using an event outcome server.

FIG. 4A is the first part of a flow diagram of a process 400 according to one embodiment of the invention. Process 400 illustrates salient steps for initializing game play between two remote devices 104, 110 using an event outcome server 102. The steps may be implemented as software stored in memory and executable by one or more processors running on the devices and server. Preferably, devices 104 and 110 have installed identical versions of the Baseball Simulation software.

Process 400 begins at step 402, in which a game player, or manager, starts up the game application software on his remote computing device. The application software, resident in memory 204, causes various interactive displays to be rendered on the display monitor of computing device 104 or 110, which displays are discussed in further detail below. Technical details on computer operations such as transmitting and receiving data communications and rendering graphics on interactive touch screen displays are well known in the art and are not described in further detail herein. Hereafter, references to actions with respect to device 104 may apply equally to device 110, and vice versa.

At startup, the game player may register as a new manager, if not already registered. Or, a manager previously registered may request online play, as depicted in step 404. This request is sent to the event outcome server 102. In response, the server 102 in step. 406 (Ted Williams' batting average in 1941) returns an opponent list to device 104, and device 104 renders the opponent list as a selectable list on its visual display. The opponent list contains the names of all managers who are available for an online, two-player game. In step 408, the manager of device 104 selects an opposing manager from the opponent list and sends this selection to the server 102.

The server 102, in the next step 410, sends the play request to the device associated with the selected opponent. In one embodiment, server 102 maintains a database of registered managers that includes information necessary for sending the play request, e.g., through email, SMS, or some other transmission protocol that can alert the opposing manager in case the game application software is not running on his remote device. If the game is already running on device 110, the play request may cause the game play logic 216 to alert the opposing manager, e.g., via a popup or messaging window invokable within the game application software.

Method 400 proceeds at step 412 in the case where the game application software was not already running on the opposing manager's device 110. Alternatively, step 412 could occur prior to step 410. If the opposing manager accepts the play request, the acceptance is indicated in step 414 and sent to the server 102. At this point, in steps 416 and 418, the server 102 returns setup instructions to each of the remote computers 104 and 110. The setup instructions cause each of the remote computing devices to initialize a game simulation, as indicated in steps 420 and 422. Generally, game initialization involves rendering counterpart images on the respective user interfaces of the devices 104 and 110, and loading any programs into RAM from memory 104 that are required for game play. Examples of user interface displays for game initialization, and for prompting managers during the interactive phase of game play, are presented in the FIGS. 9-31 and described in further detail below.

Next, method 400 proceeds to steps 424 and 426, where the interactive phase of game play begins as each manager selects a starting pitcher, and transmits this selection to the server 102. In response, the server reports each selection to the opposing manager in steps 428 and 430. With knowledge of his opponent's starting pitcher, each manager now proceeds to set his starting lineup for game play. This action is depicted in steps 432 and 434. When each manager completes the lineup, he reports the lineup to the server 102 in steps 436 and 438, and the server in turn relays each lineup to the opposing manager in steps 440 and 442. This allows each remote computing device 102 and 110 to log the opponent's lineup, and complete the initialization.

Figure 4B:
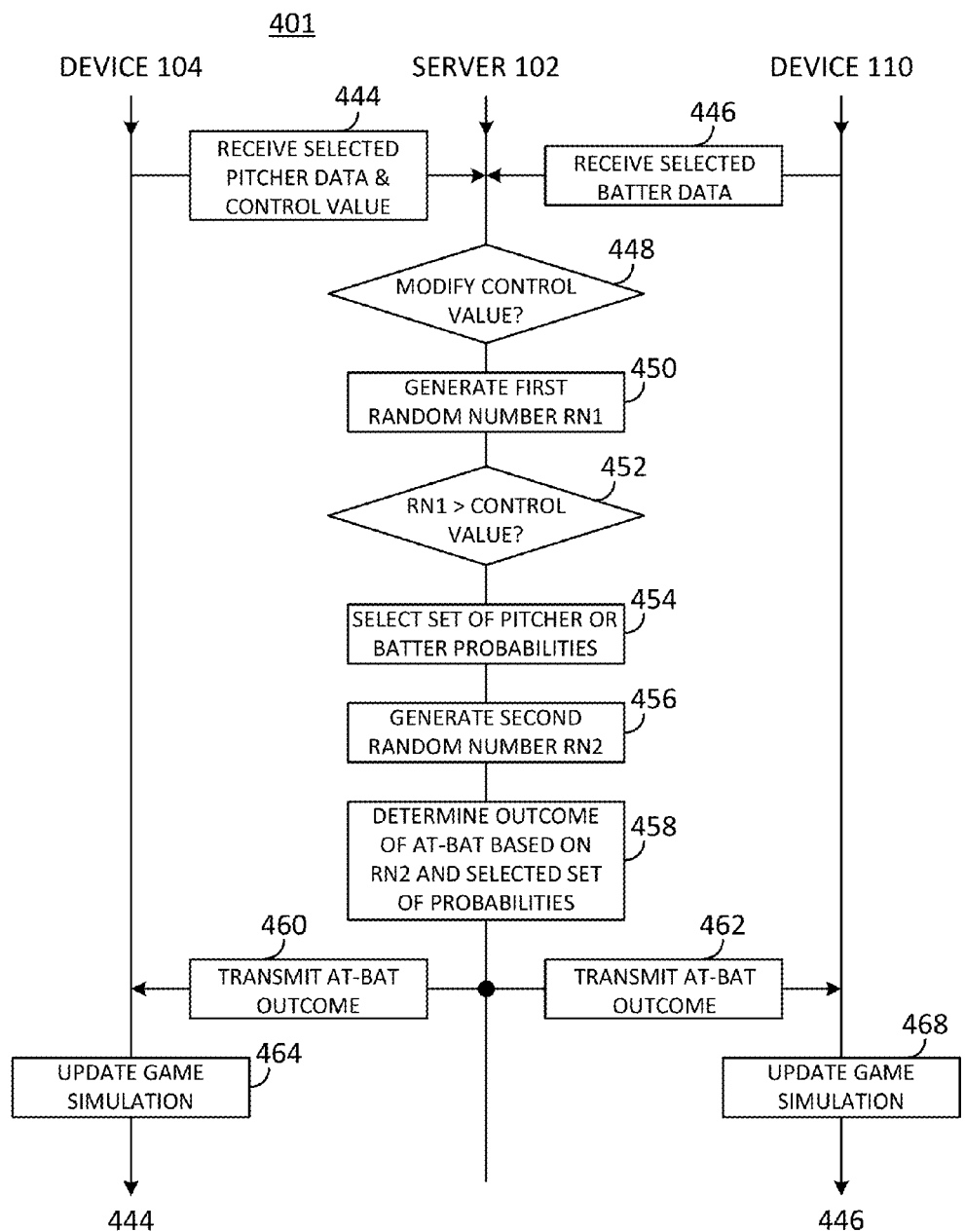
FIG. 4B is the second part of the process flow diagram of FIG. 4A illustrating basic steps according to the invention for resolving an at-bat during game play.

FIG. 4B is the second part of the flow diagram of FIG. 4A, depicting a process 401, which illustrates basic steps according to the invention for resolving an at-bat during Simulated Baseball game play. During the course of the game, as each at-bat is resolved in process 401, the game status being displayed on each of the remote devices 104, 110 is updated and process 401 is repeated for the next at-bat until the game is decided. The sequence of at-bats, or pitcher-batter engagements, that occur during the course of the game follow the standard rules of baseball, i.e., three outs per half inning for nine full innings, or if the score is tied after nine innings, until one team prevails at the conclusion of an extra inning. Variations on this sequence are possible within the scope of the invention, for example, to simulate home run derbies or games shortened by inclement weather.

The process 401 begins by setting up a pitcher-batter engagement. This is effected automatically on each remote computing device according to the current lineups and state of the game. For example, in the top of the first inning, each device will engage the home team's starting pitcher against the visiting team's leadoff batter. In this example, device 104 represents the home team, and device 110 represents the visiting team. In the first step 444, server 102 receives selected pitcher data and a pitcher control value from device 104. At about the same time, the server 102 receives selected batter data from device 110.

In the next step 448, the server 102 decides whether the particular engagement of pitcher and batter warrants a modification of the pitcher control value. This decision step embodies one implementation of the loves-to-face/hates-to-face innovative feature of Simulated Baseball according to the invention. In one example, if there is no loves-to-face/hates-to-face relationship between the selected pitcher and the selected batter, the server 448 does not modify the pitcher control value. In another example, where a loves-to-face/hates-to-face does exist between the selected pitcher and selected batter, the server 102 may raise or lower the pitcher control value. In one implementation, the pitcher control value is raised to the maximum value if the selected pitcher loves to face the selected batter. In another implementation, the pitcher control value is lowered to the minimum value if the selected pitcher hates to face the selected batter. In implementing step 448, other modifications of the pitcher control value between minimum and maximum are possible within the scope of the invention.

In the next step 450, the server 450 generates a first random number RN1, and step 452 compares RN1 to the modified (or unmodified) pitcher control value. If RN1 is not greater than the pitcher control value, then control of the engagement is awarded to the pitcher and the server 102 in step 454 selects a set of pitcher probabilities, i.e. probable outcomes of the engagement that favor the pitcher, for resolving the engagement. The pitcher probabilities are associated with, or included within, the pitcher data received in step 444. That is, the server 102 may retrieve the pitcher probabilities from memory stored locally at the server that are associated with the pitcher data, or the server may receive the pitcher probabilities in the data received at step 444. If, however, RN1 is greater than the pitcher control value, then control of the engagement is awarded to the batter and the server 102 in step 454 selects a set of batter probabilities, i.e. probable outcomes of the engagement that favor the batter, for resolving the engagement. The set of batter probabilities may be received at step 446 or retrieved locally by the server from a lookup table associated with the batter data.

Once the set of probabilities is selected, process 401 generates a second random number RN2 in step 456. Then in step 458, the server 102 determines the outcome of the engagement based on RN2 and the selected set of probabilities. For example, possible outcomes of the at-bat may be listed in an electronically stored table, with each outcome occurring with some frequency distributed across the range of RN2 that is derived from historical baseball statistics. The server 102 will then by simple comparison determine the outcome in the set of probabilities that corresponds to the particular value for RN2. Next, in steps 460 and 462, the outcome is transmitted to each of the remote devices 104, 110. In response to receiving the outcome, each device 102 and 110 updates the state of the game simulation in steps 464 and 466. For example, if the outcome is a base hit, a resulting update may include displaying a run scored, displaying a new baserunner, displaying the next batter at home plate, etc. In another example, if the outcome is a fly out, an update may include displaying an out, displaying the next batter at home plate, or effecting a change of sides if the out is the third in a half inning. If the game is not decided after steps 464 and 468, the process 401 begins again at steps 444 and 446 to set up the next at-bat.

Figure 5:
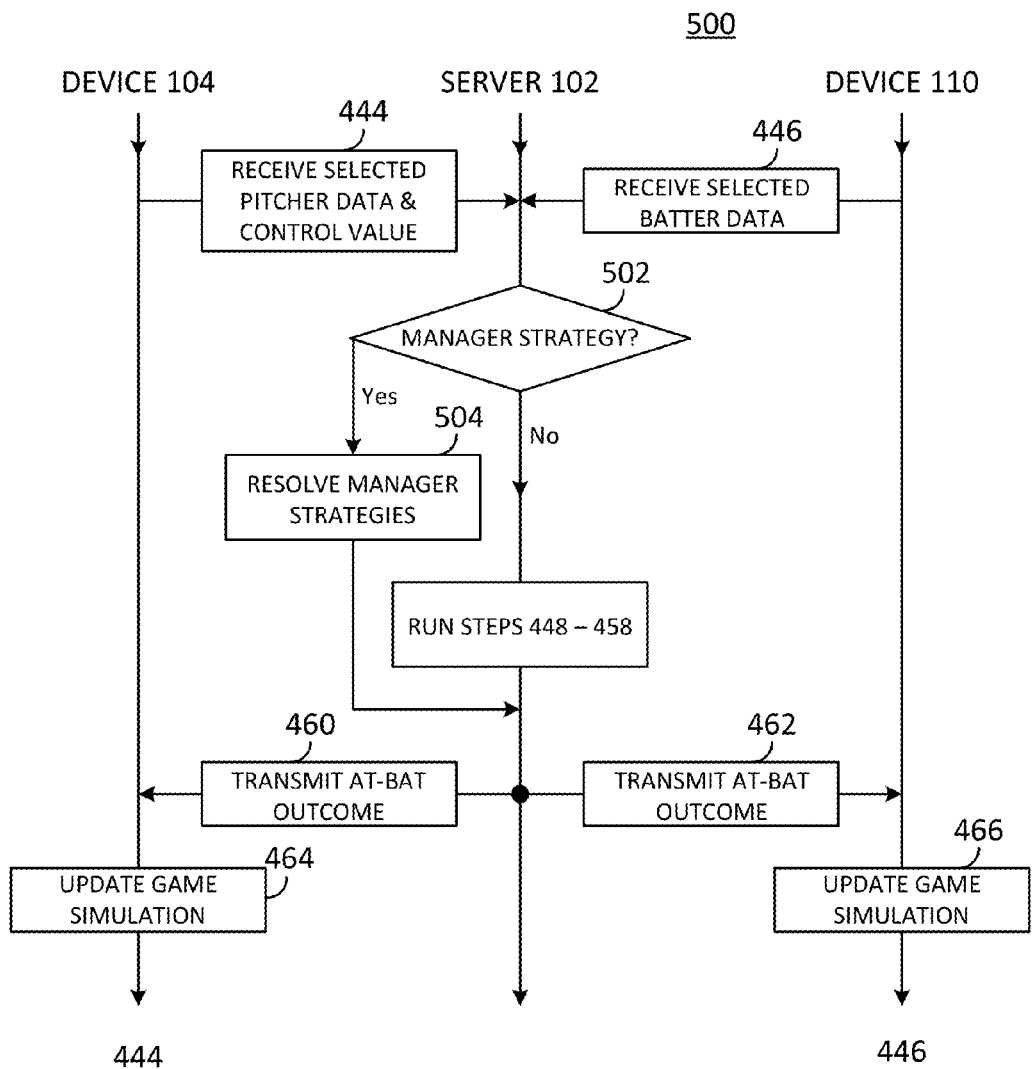
FIG. 5 is a process flow diagram according to one embodiment of the invention illustrating steps for resolving game play events that involve a manager strategy option.

FIG. 5 is a flow diagram for a process 500 according to one embodiment of the invention, illustrating steps for resolving game play events that involve a manager strategy option. Process 500 works in conjunction with process 401.

In step 502, after receiving the data in steps 444 and 446, server 102 checks for the presence of a manager strategy option in the data received. If there is no manager strategy option present, the server will proceed with steps 448 to 458 of process 401. If, however, a manager has invoked a manager strategy option, the server 102 will bypass execution of steps 448 to 458 and proceed to step 504 to resolve the manager strategy option. Various manager strategy options, such as intentional walk, stolen base attempt, hit-and-run attempt, clutch batting attempt, and bunt attempt, and methods for their resolution during game play, are described in further detail below. Once resolved, process 500 proceeds to steps 460 and 462, which are carried out as previously described within process 401.

Figure 6:
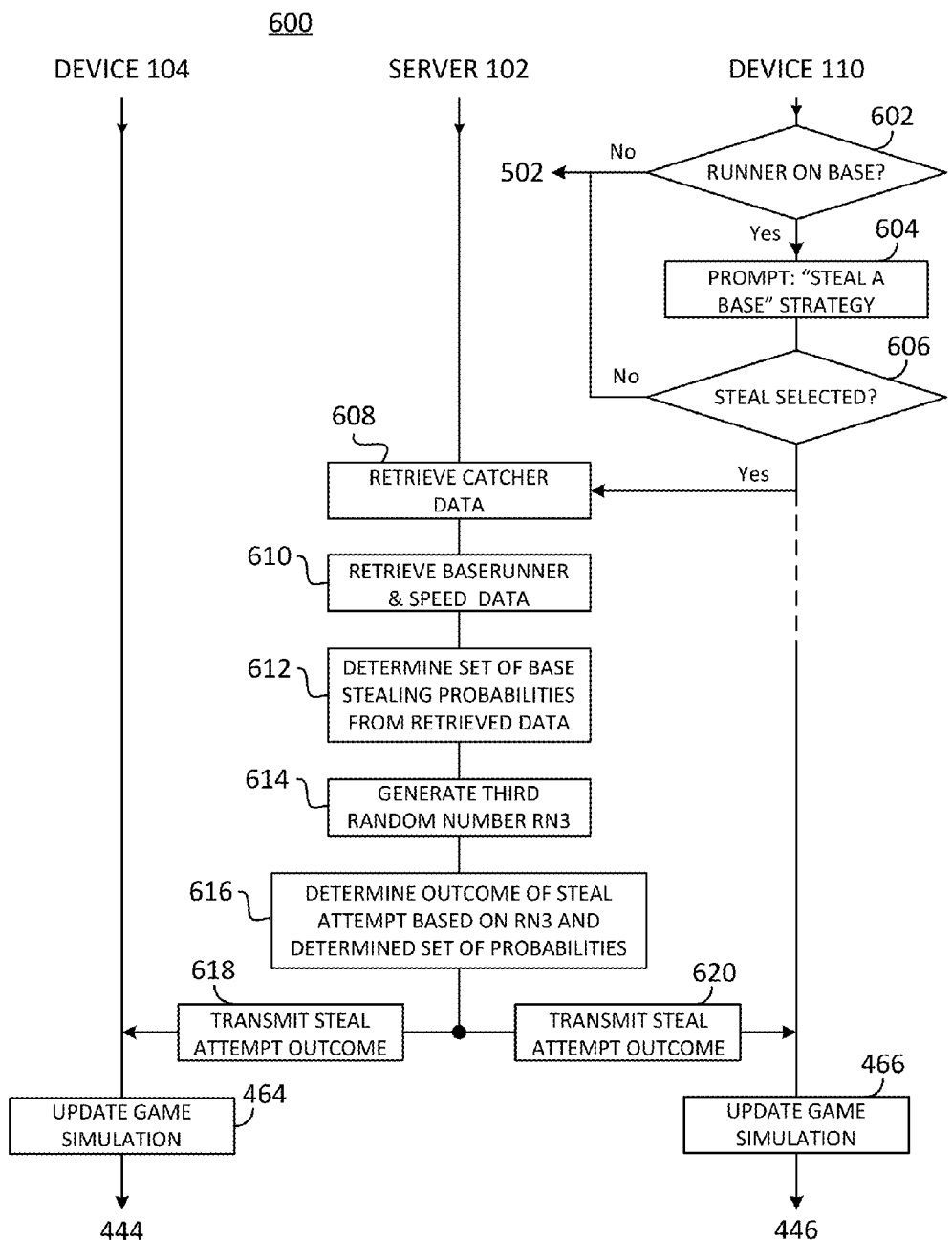
FIG. 6 is a process flow diagram according to one embodiment of the invention illustrating steps for resolving a stolen base attempt strategy option.

FIG. 6 is a flow diagram of a process 600 according to one embodiment of the invention illustrating steps for resolving a manager strategy option known as a stolen base attempt. This manager strategy option will be displayed for selection on the user interface of the remote device when its manager is on offense, and when there is at least one runner on base. Thus, process 600 may begin at step 602, for execution on the offensive device, e.g. device 110 in this example. If there is no runner on base, the process returns to step 502 (FIG. 5) with a null value indication for a stolen base attempt manager strategy. If there is a runner on base, device 110 will prompt its manager in step 604 to optionally select the "Steal A Base" strategy. In step 606, if the base-stealing option was not selected, i.e., if the manager chose another option, the process returns the null value to step 502.

If, in step 606, the offensive manager selects the "Steal A Base" strategy, a positive value is transmitted to step 502, and step 504 (resolve manager strategies) includes execution of steps 608 through 620. In step 608, the server 102 retrieves catcher data corresponding to the active catcher (i.e. the catcher who is currently in the lineup of the defensive team). Next, in step 610, the server 102 retrieves baserunner data and speed data corresponding to the baserunner attempting to steal. Next, in step 612, the server 102 determines a set of base stealing probabilities according to the retrieved catcher data, baserunner data, and speed data. In one implementation, the set of base stealing probabilities is available to server 102 in local memory. Next, in step 614, the server 102 generates a third random number RN3, and in the following step 616, determines the outcome of the stolen base attempt based on RN3 and the determined set of probabilities. This determination is effected in similar fashion as the outcome determination made in step 458, with the random number being compared to outcomes listed in a lookup table. The determined outcome is then sent to the remote devices 102 and 110 in steps 618 and 620. Finally, in steps 464 and 466 the status of the game is updated at each remote device as previously described.

Figure 7:
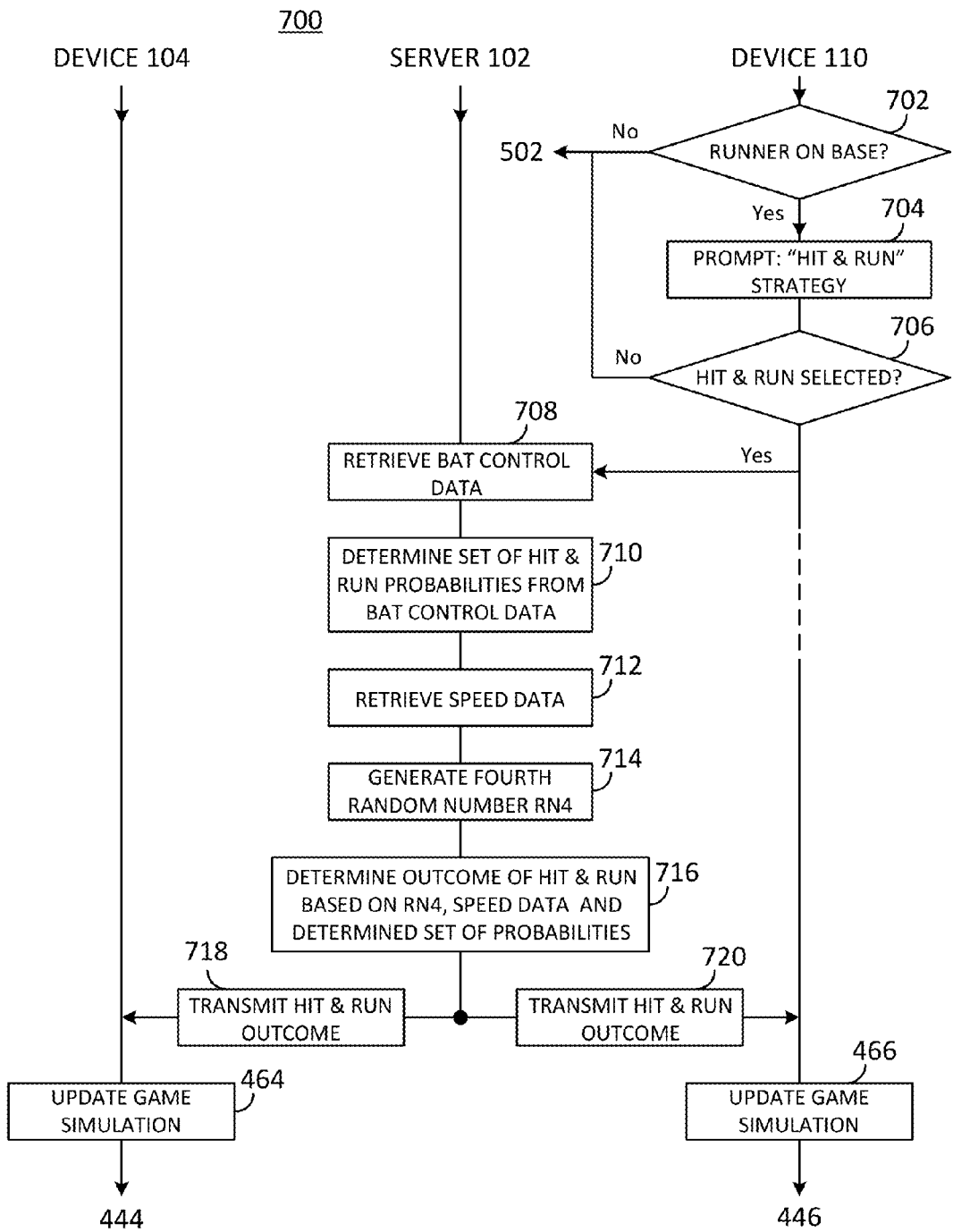
FIG. 7 is a process flow diagram according to one embodiment of the invention illustrating steps for resolving a hit-and-run attempt strategy option.

FIG. 7 is a flow diagram of a process 700 according to one embodiment of the invention illustrating steps for resolving a manager strategy option known as a hit-and-run attempt. The structure is similar to process 600, in that the conditions that cause the processing of this strategy option are invoked by the offensive manager manipulating user interface selections that are presented on the display of remote device 110. To begin, at step 702 device 110 decides whether the game status includes a base runner. If not, a null value is returned to step 502. If so, the user interface of device 110 prompts the offensive manager at step 704 to select the "Hit-and-Run" strategy. If not selected at step 706, the null value is returned to step 502.

The manager may, however, select the "Hit-and-Run" strategy at step 706, in which case process 700 returns a positive value to step 502 and step 504 (resolve manager strategies) includes execution of steps 708 through 720. In step 708, the server 102 retrieves bat control data associated with the selected batter. Next, in step 710, the server 102 determines a set of hit-and-run probabilities according to the bat control data. As in other manager strategy options, the probability set may be received with the batter data or stored locally at the server. Next, in step 712, the server 102 retrieves speed data associated with the runner on base during the hit-and-run attempt. In one embodiment, although the speed data is not a factor in determining the set of hit-and-run probabilities, speed may be outcome-determinative for the fate of the runner in a case where the outcome of the pitcher-batter engagement results in no contact being made, i.e. a base on balls or strikeout. In such case, the speed data may determine whether the runner is caught stealing or successfully steals a base.

In the following step 714, the server 102 generates a fourth random number RN4. Then in step 716 the server determines the outcome of the hit-and-run attempt based on RN4, speed data, and the determined set of hit-and-run probabilities, for example, using a lookup table. The determined outcome is then transmitted in steps 718 and 720 to the remote devices 104 and 110, which respectively update the game simulation at steps 464 and 466.

Figure 8:
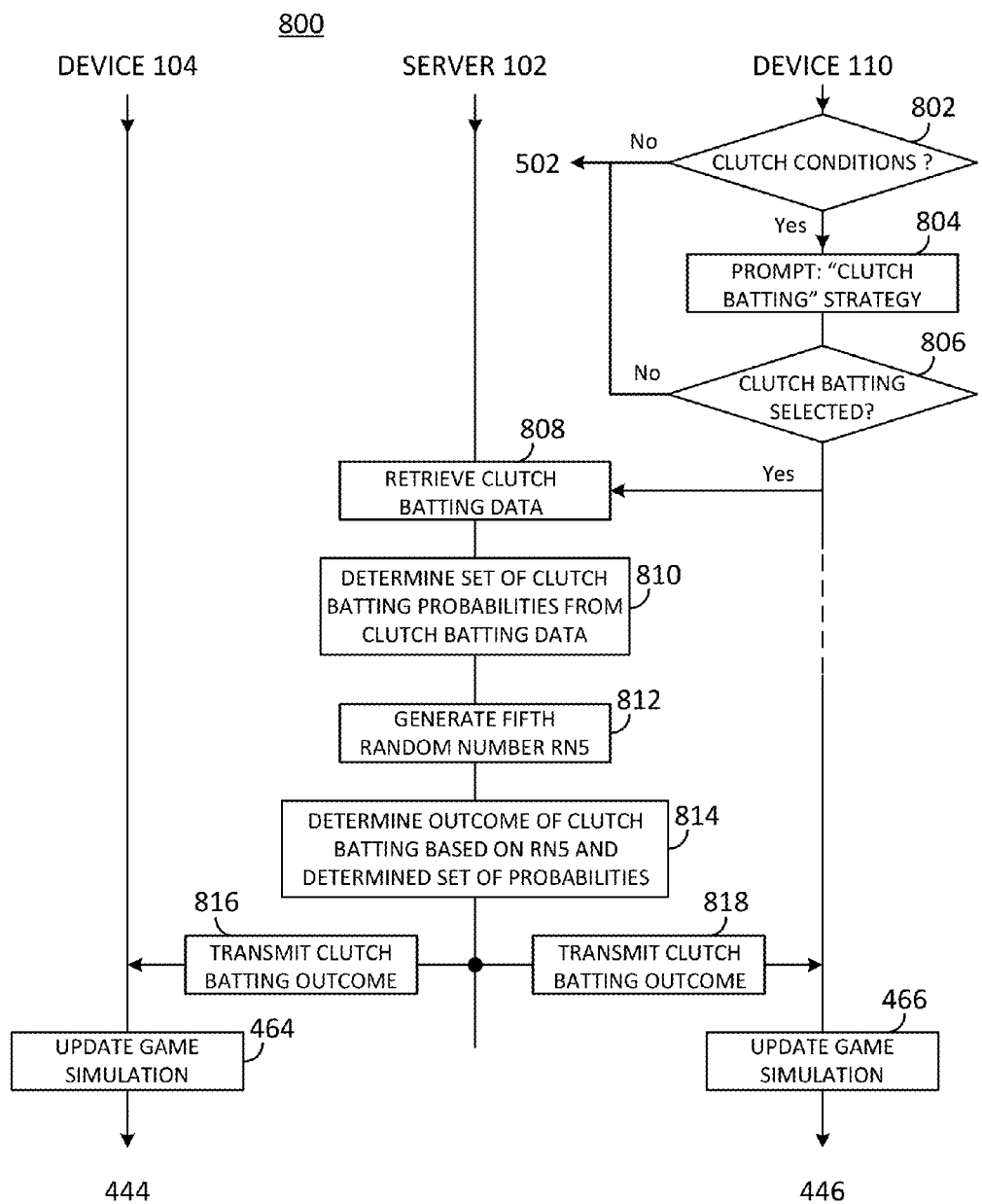
FIG. 8 is a process flow diagram according to one embodiment of the invention illustrating steps for resolving a clutch batting attempt strategy option.

FIG. 8 is a flow diagram of a process 800 according to one embodiment of the invention illustrating steps for resolving a manager strategy known as a clutch batting attempt. The structure of process 800 is similar to the structure needed to resolve a manager strategy for a bunt attempt.

As in prior strategy processes, process 800 begins at the remote device 110 of the offensive manager. In the initial step 802, device 110 determines whether the conditions exists for a clutch batting attempt. In one implementation, the condition exists if the game state is seventh inning or later with the tying run on base. In another implementation, the condition exists if the game state is the ninth inning or later and the batter represents the tying or go-ahead run. If the condition does not exist, a null value is returned to step 502. However, if the condition exists, the device 110 in step 804 prompts the manager of the offensive team on the user interface to select the "Clutch Batting" strategy. Then in step 806, if the clutch batting option is not selected, a null value is returned to step 502. But if clutch batting is selected at step 806, a positive value is returned to step 502 and step 504 (resolve manager strategies) includes execution of steps 808 through 818.

When clutch batting is selected, at step 808 the server 102 retrieves clutch batting data associated with the batter, through either a remote transmission or local lookup. Next, in step 810, the server 102 determines a set of clutch batting probabilities based on the retrieved clutch batting data. In the next step 812, the server 102 generates a fifth random number RN5, and in step 814 determines the outcome of the clutch batting attempt based on RN5 and the determined set of clutch batting probabilities that are stored locally or received remotely. The lookup table method may be used to resolve the clutch batting attempt, as previously described with respect to resolving other manager strategy attempts. In steps 816 and 818, the server 102 transmits the outcome to remote devices 102 and 110, which respectively update game status in steps 464 and 466.

To resolve a manager strategy known as a bunt attempt, a step 802 would check for bunting conditions, such as a runner on base and less than two outs. Step 804 would prompt the offensive manager to "Bunt", and the decision block 806 would decide whether the bunt option was selected. If so, step 808 would retrieve bunt attempt data associated with the batter, step 810 would determine a set of bunt outcome probabilities based on the bunt attempt data, step 812 would generate a sixth random number RN6, and step 814 would determine the outcome of the bunt attempt based on RN6 and the determined set of bunt outcome probabilities. Results would be transmitted to the remote devices and the game updated as in other strategy resolutions.

With the foregoing system operations in mind, game play scenarios between opposing managers are now described with reference to the interactive user interface displays shown in FIGS. 9 to 31. The images shown in FIGS. 9 to 31 represent one possible embodiment of a Baseball Simulation game according to the invention.

Game Play

In a typical scenario, game play progresses as follows: A first game player/manager requests a game from another manager by selecting the "Invite a Friend" option 902 (FIG. 9) on the user interface of his mobile device. Selecting this option causes the user interface to display a list of managers, which may be a list customized by the sending manager or a list of online managers provided by the server 102. Selecting one of the listed managers causes an electronic mail message to be sent via the event outcome server 102 to the selected manager's mobile device or email server. Techniques for transmitting electronic messages, for example, via SMS technology, are well known and not discussed further herein.

Figure 16:
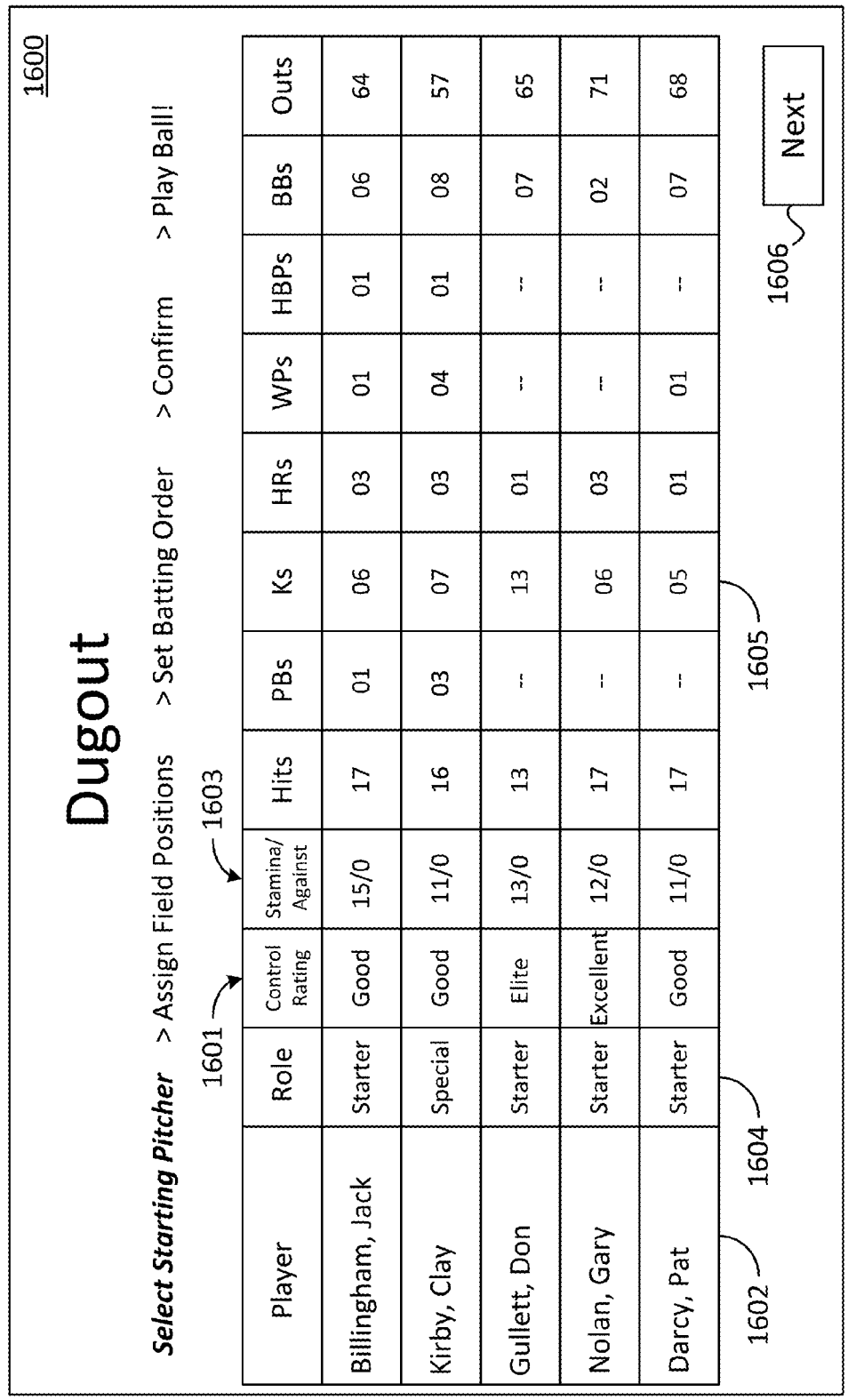
FIG. 16 shows one example of a display rendered on a user interface for prompting a manager to select a starting pitcher from a list of pitchers available for game play according to the invention.

When a receiving manager accepts the invitation to play, for example, by selecting a "Yes" button (not shown) on his user interface, an acceptance message is sent back to the server 102, which initializes a new game for the opposing managers. The game play logic 216 on each manager's mobile device receives an initialization signal from the server 102, and each mobile device, under direction from its game play logic, prompts its manager via the user interface to begin play and declare a starting pitcher (FIG. 16). The choice of starting pitcher is a human decision input to the game play logic 216 by the manager. Generally, the manager's decision will be influenced by the CONTROL RATING 1601 and STAMINA RATING 1603 of the pitchers on the roster of each manager. These ratings are displayed on the user interface "Select Starting Pitcher" screen (FIG. 16).

In one embodiment, every starting pitcher must "rest" for three games before their STAMINA RATING 2105 returns to its maximum value. Thus, a manager is prevented from using their best starting pitcher for every game. This rest requirement does not apply to relief pitchers (that is, their STAMINA RATING returns to its maximum value after each game—except in the following case). However, an additional impact to the STAMINA RATING of a given pitcher (starter or reliever) is: if that pitcher left a previous game with "negative" points against them (that is, they were left in after their STAMINA RATING was reduced to zero and additional positive results occurred for the team at bat), the negative quantity is "carried over" into the next two games for a starter and the next game for a reliever. This rule generally affects relievers, since starters are typically left on the bench until their three game required rest has elapsed, but sometimes a manager will insert a resting starter into a given game as a reliever to absorb some of the "punishment" of a particularly strong or lucky batting team.

Each manager reviews the opposing player's roster on their mobile device and notes any important details about the opposing team's players. These details typically include DEFENSIVE RATINGS (1701, 1702, 1703, 1705, 1707, 1709), STRATEGY OPTIONS (1901, 1903, 1905, 1907), and LOVES TO FACE/HATES TO FACE relationships (2102, 2103).

Using "hotkeys" and dedicated buttons on their mobile device, for example, as displayed on a touch-sensitive user interface display, each manager sets a batting order (FIG. 19) and assigns defensive positions (FIG. 17).

The "home team" plays defense during the top half of each inning, while the "away team" bats during the top half of each inning. In the bottom half of each inning, the roles are reversed—the away team plays defense and the home team bats.

At the beginning of each at-bat, the mobile device of the manager controlling the away team (that is, the manager at bat) displays details about the pitcher (CONTROL RATING, STAMINA NUMBER, etc.) and details about the batter (BASERUNNING RATING, etc.). See FIG. 21.

Note that each manager has the option of viewing details about all of the opposing team's players on their mobile device at any time during game play by using specific hotkeys and dedicated buttons. For example, by selecting an icon representing a player in the field (FIG. 21), a popup window may appear to display the player's details. See FIG. 23.

The at-bat begins with a message on the mobile device of the manager at bat to make a decision. See the hotkeys shown in FIG. 22. That decision is to either SWING AWAY or attempt a STRATEGY OPTION, such as prompted by hotkeys BUNT ATTEMPT, STEAL A BASE, HIT n RUN ATTEMPT, and CLUTCH BATTING. The typical choice is to SWING AWAY, because successful STRATEGY OPTIONs are rare.

The manager at bat can review the STRATEGY OPTIONs available to them on their mobile device by pressing a particular hotkey that lists the available options, as well as the appropriate RATINGs for a particular option. For example, the manager at bat may press the OPTIONS hotkey and their mobile device might display the following: SWING AWAY (pitcher's CONTROL NUMBER is 58); BUNT ATTEMPT (batter's BASERUNNING RATING is EXCELLENT); PINCH HIT (check the bench). In this example, the manager at bat will simply press the key that corresponds to their particular choice.

The STRATEGY OPTIONs available to the manager at bat depend on the circumstances of the game—whether there are runners on base, the particular inning, the score, etc., as well as the RATINGs of the batter. SWING AWAY and PINCH HIT are options that will always be "offered" to the manager at bat. Other STRATEGY OPTIONs are: BUNT ATTEMPT, HIT n RUN ATTEMPT, CLUTCH BATTING, STEAL A BASE, and PINCH RUN, depending on the game circumstances.

If the manager at bat elects to SWING AWAY, then the game computer first checks for CONTROL of the result of the at-bat as follows:

The computer generates a random number and compares that number to the pitcher's CONTROL NUMBER. If the generated random number is less than or equal to the pitcher's CONTROL NUMBER, then the result of the at-bat is determined by the pitcher's statistical model. If the generated random number is greater than the pitcher's CONTROL NUMBER, then the result of the at-bat is determined by the batter's statistical model. For example, the pitcher's CONTROL RATING might be EXCELLENT, with a CONTROL NUMBER of 70 and the generated random number might be 64. In this instance, the generated random number (64) is less than the pitcher's CONTROL NUMBER (70), so the result of the at-bat will be determined by the pitcher's statistical model.

After determining which statistical model will control the result of the at-bat, the computer generates another random number and checks the appropriate statistical model for the result.

The generated random number will fall into a range on the major leaguer's statistical model that corresponds to a particular result. For example, the generated random number might be 32, which might correspond to a STRIKEOUT on the pitcher's statistical model, but might correspond to a double on the batter's statistical model. Hence, the statistical model that controls the at-bat is a critical element of game play. This is why managers will frequently attempt STRATEGY OPTIONs against strong pitchers—to attempt to bypass the CONTROL step of an at-bat.

If the manager at bat does elect to attempt a STRATEGY OPTION, then the computer does not check the pitcher's CONTROL NUMBER. Rather, the computer generates a random number and compares that number to the appropriate chart. The generated random number will fall into a range on the chart that corresponds to a particular result.

For example, the manager at bat may elect a BUNT ATTEMPT. The generated random number might be 21, which corresponds to a successful bunt hit on the BUNT ATTEMPT chart. In this instance, the manager at bat has bypassed the CONTROL step of the batter/pitcher match-up and has successfully reached base, which decrements the pitcher's STAMINA NUMBER by at least one. This is a desirable result if the pitcher's CONTROL RATING is EXCELLENT or better, which means that pitcher will CONTROL the at-bat more often than not, and the result of the at-bat will be determined by that pitcher's statistical model, which is likely to be very negative for the batting team and very positive for the team in the field.

Depending on the result of the at-bat, there may be further options available for the manager at bat or for the manager in the field.

For example, if there are runners on base, and the batter makes an out, the manager in the field may be prompted to decide whether or not to attempt a double play (FIG. 24). Or, the manager at bat may be prompted to decide whether or not to attempt to take an extra base, e.g., whether to advance on a fly ball (FIG. 26).

Whenever a manager is prompted to make a decision, their mobile device displays a message along with a list of choices and the likelihood of success for a given choice. For example, the likelihood of success for an advance on a fly ball generally depends on the BASERUNNING RATING of the runner, the DEFENSIVE RATING of the outfielder, and whether or not the fly ball was "DEEP." However, when a runner is attempting to score from third base, that runner's STEAL RATING is considered as well.

For example, suppose there is a runner on third base and the batter hits a fly ball to the outfield. If the batter's fly-out is not the third out of the inning, then the mobile device of the manager at bat will display a message such as, "Batter flies out to left field. Do you want to try to score with the runner on third base (66% chance of success)?" If the manager at bat elects to try to score, then the mobile device of the manager in the field displays a message such as, "Fly ball to left field, the runner on third is trying to tag up and score. Do you want to try to throw the runner out at home (34% chance of success)?"

The manager in the field is prompted with a decision because there may be other runners on base and, if the manager in the field attempts to throw out the runner at home, the other runners on base will automatically advance. Thus, the manager in the field may elect to concede the run and keep the other runners from advancing. This is a particularly common choice if the chance of success of throwing out the runner is very low, or the defensive team has a large lead.

Ultimately, the at-bat concludes with either one or more outs being made in the field or a positive outcome for the team at bat, such as a batter reaching base, a runner advancing, or a run being scored. If the outcome of the at-bat is a negative result for the defensive team (i.e., a hit, run, stolen base, walk, or hit-by-pitch), then the pitcher's STAMINA NUMBER may be decremented by one.

For example, suppose there is a runner on third base and the batter gets a hit. In this instance, the runner will score a run. Therefore the pitcher's STAMINA NUMBER is decremented by two—one for the batter's hit and one for the runner's run scored. The pitcher's STAMINA NUMBER may be decremented for any of the following: hit, walk, hit-by-pitch, run scored, stolen base, unearned run scored, or wild pitch. The pitcher's STAMINA NUMBER may NOT be decremented for the following: extra base taken on a hit, advance on a fly ball, error, passed ball, out made.

Apart from scoring as many runs as possible, a secondary goal of the team at bat is to decrement the pitcher's STAMINA NUMBER as much as possible.

There are two reasons for this goal: First, when a starting pitcher's STAMINA NUMBER has been reduced to 33% of its maximum value, that pitcher is said to be "tired," which has an effect on their CONTROL NUMBER. Specifically, a tired pitcher's CONTROL RATING is reduced by one level.

For example, suppose a starter has a CONTROL RATING of EXCELLENT, with a CONTROL NUMBER of 70. As well, suppose this pitcher normally has 12 STAMINA points. At the point in the game when eight (8) positive offensive outcomes (hit, walk, run, steal, etc.) have occurred, this pitcher's STAMINA points will have been reduced to 4, which is 33% of their maximum value of 12. At this point, the pitcher's CONTROL RATING is now GOOD, with an associated CONTROL NUMBER of 60. Hence, when the manager at bat elects to SWING AWAY (which means that the game computer will check the pitcher's CONTROL NUMBER against a generated random number to determine which statistical model will control the result of the at-bat), the pitcher will only control the result of the at-bat if the generated random number is less than or equal to 60, rather than 70. In other words, by causing the starting pitcher to become tired, the manager at bat has increased their chances of controlling a given at-bat's result by 10%.

Further, when another three (3) positive offensive outcomes have occurred, this pitcher's STAMINA NUMBER will have been reduced to one (1). It is not unusual for a Major League pitcher to summon an extra effort to pitch well right before he is completely exhausted. Hence, when this pitcher reaches his final STAMINA point, his CONTROL RATING returns to its original value (and, of course, his CONTROL NUMBER returns to its original value as well), reflecting this pitcher's "final effort."

Ultimately, when any pitcher's STAMINA NUMBER has been reduced to zero (0), then that pitcher no longer has the ability to CONTROL the result of any at-bat. In other words, when a pitcher's STAMINA NUMBER is reduced to zero, the batter's statistical model ALWAYS CONTROLs the result of the at-bat. Equivalently, step 448 (FIG. 4B) may reduce the pitcher's control value to zero. When a pitcher's STAMINA NUMBER has been reduced to zero, the manager in the field may elect to substitute a relief pitcher, or they may elect to leave the "exhausted" pitcher in the game. Even though the batter will CONTROL an at-bat, it is not unusual for the manager in the field to leave an "exhausted" pitcher in the game and take their chances.

There are several reasons for this choice. For example, the batter may have a relatively "weak" statistical model, that is, the batter's statistical model may often result in an out being made. As well, the batter may have an advantage with a particular STRATEGY OPTION, so the manager in the field may elect to leave the pitcher in and give up an INTENTIONAL WALK, which places the decrement of the STAMINA NUMBER on a pitcher that is already "exhausted," rather than on a "fresh" relief pitcher. Or, the manager in the field may even elect to let the manager at bat take their chances with the STRATEGY OPTION.

Notably, this element of the game—a manager taking chances with the odds against them—is a key element to the satisfaction that a manager will experience while playing. Because the game is intrinsically random, yet deterministic, EVERY game situation may yield a new and different result from a similar, previous situation. If the manager in the field elects to let the manager at bat choose their most advantageous OPTION with the batter—and the result is an out—the manager in the field will experience a great deal of satisfaction.

If the third out has not been made in the previous at-bat, then the next batter in the order is now "up to bat" and their at-bat progresses similarly to the description above. That is, the manager at bat decides whether to SWING AWAY or attempt a STRATEGY OPTION and the computer generates random numbers and checks for the result of the at-bat appropriately.

A further level of complexity in a "typical" SWING AWAY at-bat occurs if the batter and the pitcher have a LOVES TO FACE/HATES TO FACE relationship.

It is not uncommon in Major League Baseball for a particular batter to perform especially well against a particular pitcher, or for a particular pitcher to perform well against a particular batter. Often, in these situations, it is a second-tier player that has the upper hand over a star player. This situation is simulated in the game by the use of LOVES TO FACE/HATES TO FACE relationships.

There are four possible permutations: the pitcher LOVES TO FACE the batter, the pitcher HATES TO FACE the batter, the batter LOVES TO FACE the pitcher, or the batter HATES TO FACE the pitcher. The effects of the pitcher LOVES TO FACE the batter and the batter HATES TO FACE the pitcher are the same, as are the effects of the pitcher HATES TO FACE the batter and the batter LOVES TO FACE the pitcher—so the four possible permutations yield two possible game scenarios, with ramifications.

If the pitcher LOVES TO FACE the batter or the batter HATES TO FACE the pitcher, then the rules of the at-bat change as follows: the pitcher's CONTROL RATING increases to DOMINANT, and their CONTROL NUMBER increases to 90—against that batter only. As well, the manager at bat is not able to attempt any STRATEGY OPTIONs with the batter—while facing that pitcher. In the opposite scenario (i.e. the pitcher HATES TO FACE the batter or the batter LOVES TO FACE the pitcher), the only change is that the pitcher's CONTROL RATING decreases to POOR and their CONTROL NUMBER decreases to 30.

Ultimately, this additional wrinkle leads to a number of effects on a manager's decision making. A manager might leave a particularly strong batter out of the line-up because the opposing starter LOVES TO FACE that batter. Or, he might save a particular batter to pinch hit at a key moment because the opposing team's star reliever HATES TO FACE that batter. Similarly, a manager in the field might bring in a particular reliever at a key moment to face a strong batter because that pitcher LOVES TO FACE that batter. This choice is an effective method of preventing the manager at bat from utilizing a key STRATEGY OPTION, often stopping a rally and preserving a small lead.

This is why the entire roster of an opposing team's players (along with all of their details) is known to both managers before the game begins—because there may be a meaningful LOVES TO FACE/HATES TO FACE relationship that can be exploited later in the game.

Strategy Options

Strategy options are attempted as follows:

Any major leaguer's statistical model that includes a BASERUNNING RATING of either ELITE or EXCELLENT may attempt to bunt for a base hit—once per game.

If a manager attempts to bunt during their at-bat, then the pitcher's CONTROL NUMBER is not utilized, nor is the result of the at-bat determined by either the pitcher's or the batter's statistical model. Instead, the game computer generates a random number and compares it to the BUNT ATTEMPT chart. The generated random number will correspond to some outcome on the chart, often depending on the BASERUNNING RATING of the batter and/or the DEFENSIVE RATING of certain defensive players. That outcome is the result of the at-bat for that batter.

It is important to note that the outcome of the BUNT ATTEMPT chart is not always positive for the batter. In fact, it is more likely to be a negative outcome (making an out, foul bunt attempt, etc.). Nevertheless, when facing a pitcher with a CONTROL RATING of ELITE or EXCELLENT, the manager at bat will often attempt many strategy options in hopes of bypassing the pitcher's CONTROL step of the at-bat and eventually wearing the pitcher's STAMINA NUMBER down.

If there is either a runner on first base only or runners on first and third base (that is, at least a runner on first and no runner on second), then the manager at bat may elect to attempt a HIT-AND-RUN strategy play.

If a manager attempts a HIT-AND-RUN during their at-bat, then the pitcher's CONTROL NUMBER is not utilized, nor is the result of the at-bat determined by either the pitcher's or the batter's statistical model. Instead, the game computer generates a random number and compares it to the HIT-AND-RUN chart. The generated random number will correspond to some outcome on the chart. That outcome is the result of the at-bat for that batter, often depending on the BAT CONTROL RATING of the batter, the STEAL RATING of the runner on first base, and/or the DEFENSIVE RATING of certain defensive players.

It is important to note that the outcome of the HIT-AND-RUN chart is not always positive for the batter. In fact, it is more likely to be a negative outcome (making an out, runner caught stealing, etc.). Nevertheless, when facing a pitcher with a CONTROL RATING of ELITE or EXCELLENT, the manager at bat will often attempt many strategy options in hopes of bypassing the CONTROL step of the at-bat and eventually wearing the pitcher's STAMINA NUMBER down. Any batter may attempt a HIT-AND-RUN, but the outcome will likely be negative for the team at bat, since the majority of the major leaguers will have a BAT CONTROL RATING of FAIR.

If certain game conditions hold, then the manager at bat may elect to attempt CLUTCH HITTING with any batter.

In one embodiment, the game conditions required for a CLUTCH HITTING attempt are as follows: the game is in the seventh inning or later; the team at bat is behind; and the tying run is on base. If the game is in the ninth inning or later, then the tying run need only be at bat for a CLUTCH HITTING attempt to be valid.

If a manager attempts CLUTCH HITTING during their at-bat, then the pitcher's CONTROL NUMBER is not utilized, nor is the result of the at-bat determined by either the pitcher's or the batter's statistical model. Instead, the game computer generates a random number and compares it to the CLUTCH HITTING chart. The generated random number will correspond to some outcome on the chart. That outcome is the result of the at-bat for that batter, often depending on the CLUTCH BATTING RATING of the batter.

It is important to note that the outcome of the CLUTCH BATTING chart is not always positive for the batter. In fact, it is more likely to be a negative outcome (making an out, double play, etc.). Nevertheless, when facing a pitcher with a CONTROL RATING of ELITE or EXCELLENT, the manager at bat will often attempt many strategy options in hopes of bypassing the CONTROL step of the at-bat and eventually wearing the pitcher's STAMINA NUMBER down. Any batter may attempt CLUTCH HITTING, but the outcome will likely be negative for the team at bat, since the majority of the major leaguers will have a CLUTCH HITTING RATING of FAIR.

If there is a runner on any base and the base ahead of the runner's base is open, then the manager at bat may elect to attempt to STEAL A BASE.

If a manager attempts to STEAL A BASE, then the at-bat is suspended momentarily. The batter remains at bat and the pitcher's CONTROL NUMBER is not utilized. The computer generates a random number and compares it to the appropriate STEAL ATTEMPT chart (i.e., STEAL 2ND, STEAL 3RD, or STEAL HOME). The generated random number will correspond to some outcome on the chart. That outcome is the result of the STEAL ATTEMPT, often depending on the STEAL RATING of the runner and/or the DEFENSIVE RATING of the catcher.

If the runner successfully steals, then the pitcher's STAMINA NUMBER is decremented by one. In the case of a successful steal of home, the pitcher's STAMINA NUMBER is decremented by two—one for the steal and one for the run scored.

After the STEAL ATTEMPT, the at-bat returns to the batter-pitcher match-up, and the manager at bat may elect to SWING AWAY or attempt another, appropriate STRATEGY OPTION.

Notably, the invocation of STRATEGY OPTIONs attempt by the manager at bat may be extended to extreme lengths. For example, suppose that there is a runner on first base and a runner on third base, with a batter at the plate who has a BASERUNNING RATING of ELITE. The manager at bat might first attempt to STEAL SECOND BASE with the runner on first. Perhaps the result is that the runner cannot get a good jump, so that his opportunity to STEAL has been exhausted for this at-bat.

The manager at bat might then attempt to HIT-AND-RUN with the batter. Perhaps the result of that HIT-AND-RUN attempt is a foul ball, so that the batter's opportunity to HIT-AND-RUN has been exhausted for this at-bat.

The manager at bat might then attempt to STEAL HOME with the runner on third base. Perhaps the result of that STEAL ATTEMPT is that the runner cannot get a good jump, so that his opportunity to STEAL has been exhausted for this at-bat.

The manager at bat might then elect a BUNT ATTEMPT with the batter. Perhaps the result of that BUNT attempt is that the bunt try goes foul, so that the batter's opportunity to BUNT has been exhausted for the game.

In this example, four different random numbers have been generated by the game computer and checked against four different strategy charts. All of this has occurred without making any check of the pitcher's CONTROL NUMBER. This sort of play is typical if the pitcher has a CONTROL RATING of ELITE or EXCELLENT and the manager at bat is "desperate" to create positive offensive outcomes against the pitcher.

It is also possible for the manager in the field to use a STRATEGY OPTION of their own to help their cause: At any point in the game, the manager in the field may elect to have their pitcher INTENTIONALLY WALK the batter at bat.

There are multiple effects of an INTENTIONAL WALK. First, the batter takes first base, which may move runners up one base as well, if they are occupying a base that will be taken. For example, if there is a runner on first, the INTENTIONAL WALK forces that runner to second base.

Another effect of the INTENTIONAL WALK is that the batter has been blocked from utilizing any STRATEGY OPTIONS. By being INTENTIONALLY WALKED, the batter is no longer able to attempt to BUNT FOR A HIT, he is no longer able to attempt a HIT-AND-RUN, and he is no longer able to attempt CLUTCH HITTING. Hence, it is not unusual for the manager in the field to INTENTIONALLY WALK a batter with a HIT-AND-RUN RATING or a CLUTCH BATTING RATING of ELITE or EXCELLENT.

The final effect of an INTENTIONAL WALK is that the pitcher's STAMINA NUMBER is decremented by one (for the walk). Because of this effect on the pitcher's STAMINA NUMBER, the manager in the field must consider all of his options before deciding to INTENTIONALLY WALK a batter.

The final note about STRATEGY OPTIONS pertains to the situation where either the batter HATES TO FACE the pitcher or the pitcher LOVES TO FACE the batter.

If either of these situations is present, then the manager at bat is not allowed to attempt any STRATEGY OPTION with that batter. The manager at bat may still attempt to STEAL A BASE if appropriate, but the batter is "powerless" against that particular pitcher. The reverse of this situation does not hold any restrictions. That is, if the batter LOVES TO FACE the pitcher, or the pitcher HATES TO FACE the batter, the manager in the field may still elect to INTENTIONALLY WALK the batter.

Game Play Examples (with Decisions)

Following are several examples of how the managers interact with each other and the game computer on their mobile devices, and how the game prompts them to make decisions:

At the beginning of an at-bat, during the batter-pitcher match-up, the game computer prompts the managers on their mobile devices in the following sequence:

The game computer first checks whether or not a STRATEGY OPTION is available to either manager.

If the manager in the field is likely to INTENTIONALLY WALK the batter, then the game computer prompts that player on their mobile device to make a decision to INTENTIONALLY WALK the batter or not. When appropriate, the INTENTIONAL WALK decision is always the first prompt by the game computer to either manager during a given at-bat. As well, the manager in the field always has the OPTION to SUBSTITUTE for any defensive player or to SUBSTITUTE a relief pitcher for the starter. This OPTION is always offered to the manager in the field.

If the manager in the field elects not to INTENTIONALLY WALK the batter, then the game computer checks whether or not a STRATEGY OPTION exists for the manager at bat. For example, the batter may have a BASERUNNING RATING of ELITE or EXCELLENT and may not have utilized their attempt to BUNT FOR A HIT during the game. In this instance, the game computer will prompt the manager at bat on their mobile device to make a decision to attempt to BUNT FOR A HIT or not.

It is very likely that the manager at bat will have more than one STRATEGY OPTION available to them during any given at-bat. For example, the batter may have a BASERUNNING RATING of ELITE or EXCELLENT and not yet have utilized their BUNT attempt; and there may be a runner at first base, with second base open. In this instance, the manager at bat has all of the following STRATEGY OPTIONS available to them: BUNT ATTEMPT, HIT-AND-RUN ATTEMPT, STEAL A BASE, PINCH HIT for the batter, or even PINCH RUN for the runner on first base. As well, if the game is in the seventh inning or later and the score is close enough, the manager at bat also has the option to attempt CLUTCH HITTING. Of course, the manager at bat also always has the option to SWING AWAY.

In order to succinctly prompt the managers for their decision(s), the game computer offers all of the appropriate options to the managers in "multiple choice" format on their mobile devices. For example, the manager at bat may be prompted to push the "1" key to attempt to BUNT, the "2" key to attempt to HIT-AND-RUN, the "3" key to attempt to STEAL, the "4" key to attempt CLUTCH HITTING, the "5" key to insert a PINCH HITTER, the "6" key to insert a PINCH RUNNER, or the "space" key to SWING AWAY. On appropriate mobile devices, a "touch" option on a touch-sensitive display may also be utilized for the manager at bat to respond to these prompts.

If the manager in the field elects not to INTENTIONALLY WALK the batter and the manager at bat elects to SWING AWAY, then the game computer checks the pitcher's CONTROL NUMBER to determine whether the pitcher or batter controls the outcome of the at-bat and then checks the appropriate statistical model to determine the result of the at-bat.

If the result of the at-bat is a wild pitch or a passed ball, then any runners that are on base advance to the next base (including a runner on third base, who scores a run). In the case of a wild pitch, the pitcher's STAMINA NUMBER is decremented by one, or by two if there was a runner on third base who scores a run. In the case of a passed ball, the pitcher's STAMINA NUMBER is not decremented, unless there was a runner on third base who scores a run, in which case the pitcher's STAMINA NUMBER is decremented by one.

If the result of the at-bat is a walk or a hit batsman, the batter takes first base, and runners are forced to appropriate bases per the traditional rules of baseball. Additionally, the pitcher's STAMINA NUMBER is decremented by one (or two if a run is forced in). No further prompts are offered to either manager during this at-bat.

If the result of the at-bat is a single to left field, right field, or center field, the batter takes first base and all runners move up one base (e.g., a runner on third scores a run). Additionally, the pitcher's STAMINA NUMBER is decremented by one, or by two if there is a runner on third base who scores.

Before the at-bat has concluded, the game computer prompts both the manager at bat and the manager in the field for further decisions.

If there are runners on base (other than a runner on third), the manager at bat is prompted, on their mobile device, to decide whether or not to try to take an extra base on the batter's hit. In this instance, the manager at bat receives a message that the batter has singled to the appropriate outfield and an option to attempt to take an extra base—along with the percentage of likelihood that the runner will successfully advance. Often, this percentage will depend on the BASERUNNING RATING of the runner in question and the DEFENSIVE RATING of the appropriate outfielder.

For example, suppose that there is a runner on first base at the beginning of the at-bat, and the batter singles to right field. Additionally, suppose that the runner's BASERUNNING RATING is EXCELLENT and the Right Fielder's DEFENSIVE RATING is GOOD. In this instance, the game computer prompts the manager at bat with a message on their mobile device similar to, "Single to right field, do you want to try to take third base with the runner on first (chance of your success is 82%)?"

If the manager at bat decides to try for the extra base, then the game computer prompts the manager in the field with a message on their mobile device similar to, "The runner on first is trying for third. Do you want to try to throw him out (chance of your success is 18%)?" This prompt occurs because the batter will automatically advance to second base on a throw to third. Hence, the manager in the field may elect to concede third base to the runner and hold the batter at first.

If the manager at bat decides to try for the extra base and the manager in the field decides to try to throw the runner out, then the game computer generates a random number and compares it to the percentage of likelihood for success. If the generated random number is less than or equal to the percentage of likelihood for success, then the runner has successfully taken an extra base. (NOTE: the pitcher's STAMINA NUMBER is not decremented for a runner successfully taking an extra base, unless that runner was on second base and scores a run).

These types of decisions are an integral part of the appeal of the game—because each time this situation occurs, the decision must be made based on the conditions at that time, including: the inning of the game, the score of the game, the BASERUNNING RATING of the runner, the DEFENSIVE RATING of the outfielder, the current STAMINA NUMBER of the pitcher, and even the rosters of the two teams. A positive effect of playing the game is that, when managers make difficult decisions and are successful, they experience a great deal of satisfaction. In fact, the more hopeless or desperate the situation is when a difficult decision is made by a manager, the greater the level of satisfaction that manager experiences with success.

Summarizing the options on a single to any outfield:

If there are no runners on base, then the batter takes first base and the pitcher's STAMINA NUMBER is decremented by one.

If there is a runner on first base, the batter takes first base, the runner automatically takes second base, the manager at bat is prompted to decide whether or not to attempt to take an extra base (third), the manager in the field is prompted to decide whether or not to attempt to throw that runner out (if there is an extra base attempt), the pitcher's STAMINA NUMBER is decremented by one, and the batter advances to second (if there is an attempt to throw out the advancing runner).

If there is a runner on second base, the batter takes first base, the runner automatically takes third base, the manager at bat is prompted to decide whether or not to attempt to score a run, the manager in the field is prompted to decide whether or not to attempt to throw that runner out (if there is an attempt to score), the pitcher's STAMINA NUMBER is decremented by either one (if the runner does not successfully score) or two (if the runner does successfully score), and the batter advances to second (if there is an attempt to throw out the advancing runner).

If there is a runner on third base, the batter takes first base, the runner automatically scores, and the pitcher's STAMINA NUMBER is decremented by two.

If there is a runner on first base and a runner on second base, the batter takes first base, the runners automatically move up, the manager at bat is prompted to decide whether or not to attempt to score a run with the runner on second base, the manager in the field is prompted to decide whether or not to attempt to throw that runner out at home (if there is an attempt to score), the pitcher's STAMINA NUMBER is decremented by either one (if the runner does not successfully score) or two (if the runner does successfully score), and the runner on first and the batter advance to third and second, respectively (if there is an attempt to throw out the advancing lead runner).

If there are runners on first base and third base, the batter takes first base, the runner on third base automatically scores a run, the runner on first base automatically takes second base, the manager at bat is prompted to decide whether or not to attempt to take an extra base (third), the manager in the field is prompted to decide whether or not to attempt to throw that runner out (if there is an extra base attempt), the pitcher's STAMINA NUMBER is decremented by two, and the batter advances to second (if there is an attempt to throw out the advancing runner).

If there are runners on second base and third base, the batter takes first base, the runner on third base automatically scores a run, the runner on second base automatically takes third base, the manager at bat is prompted to decide whether or not to attempt to score a run with the runner originally on second base, the manager in the field is prompted to decide whether or not to attempt to throw that runner out, the pitcher's STAMINA NUMBER is decremented by either two (if the runner on second does not successfully score) or three (if the runner on second does successfully score), and the batter advances to second (if there is an attempt to throw out the runner attempting to score).

Finally if the bases are loaded (runners on all three bases), the batter takes first, the runner on third automatically scores a run, the other runners automatically move up, the manager at bat is prompted to decide whether or not to attempt to score a run with the runner originally on second base, the manager in the field is prompted to decide whether or not to attempt to throw that runner out (if there is an attempt to score), the pitcher's STAMINA NUMBER is decremented by two (if the runner on second does not successfully score) or three (if the runner on second does successfully score), and the runner on first and the batter advance to third and second, respectively (if there is an attempt to throw out the scoring runner).

If the result of the at-bat is a double to left field, right field, or center field, the batter takes second base and all runners move up two bases (i.e., runners on third or second each score a run).

Additionally, the pitcher's STAMINA NUMBER is decremented by the appropriate amount (one if the bases were empty when the double was hit, two if there was a runner on third or a runner on second, and three if there were runners on second and third or the bases were loaded).

Additionally, if there was a runner on first before the double was hit, then the manager at bat and the manager in the field are prompted on their mobile devices similarly to the case of a possible extra base on a single. That is, the manager at bat is prompted with a message in their mobile device similar to, "Double to Center, do you want to try to score with the runner on first (chance of your success is 50%)?"

If the manager at bat decides to try to score, then the game computer prompts the manager in the field with a message on their mobile device similar to, "The runner on first is trying to score. Do you want to try to throw him out (chance of your success is 50%)?" This prompt occurs because the batter will automatically advance to third base on a throw home. Hence, the manager in the field may elect to concede the run and hold the batter at second.

If the manager at bat elects to try for the extra base and the manager in the field elects to try to throw the runner out, then the game computer generates a random number and compares it to the percentage of likelihood for success. If the generated random number is less than or equal to the percentage of likelihood for success, then the runner has successfully scored. (NOTE: the pitcher's STAMINA NUMBER is only decremented by one in this instance—because the runner has scored a run, not because the runner has successfully taken an extra base).

If the result of the at-bat is a triple, the batter takes third base, all runners score, and the pitcher's STAMINA NUMBER is decremented by the appropriate amount (one if the bases were empty before the triple was hit, two if there was one runner on base, three if there were two runners on base, and four if the bases were loaded). Because all runner advance three bases (which means that even a runner on first scores), there are no prompts to either manager for decisions if a batter triples.

Outs can be made one of two ways, either as a result of an at-bat from either the pitcher's or the batter's statistical model (these are called unspecified outs), or as the result of an at-bat from a STRATEGY OPTION chart (these are called specified outs).

For example, in a given at-bat, suppose that the manager at bat elects to SWING AWAY, the at-bat's result is determined by the pitcher's statistical model, the game computer generates a random number of 63, and that number corresponds to an OUT on the pitcher's statistical model. In this case, the result of the at-bat is an unspecified out. When an unspecified out is made, the game computer generates further random numbers to determine the type of out and which defensive player fields the ball—after which the game computer prompts the managers on their mobile devices to make appropriate decisions.

Alternatively, suppose that the manager at bat elects a BUNT ATTEMPT, the game computer generates a random number of 42 on the BUNT ATTEMPT chart, and that number corresponds to a ground out, 5-3 (that is, from the third baseman to the first baseman). In this case, the result of the at-bat is a specified out, with specific additional results (for example, if there was a runner on second base, the manager at bat attempted to BUNT FOR A HIT, and the result was a 5-3 ground out, then the runner on second automatically advances to third and the batter is credited with a sacrifice).

For unspecified outs:

After the game computer has determined that an unspecified out was made (from the appropriate statistical model), the computer then generates a random number and compares it to the OUT chart. The generated random number will correspond to a specific type of out.

The possible types of outs are: Line Drive, Ground Ball, Fly Ball, Pop Up, Sharp Ground Ball, Deep Fly Ball, and X. After the game computer determines the type of out, it then generates another random number and compares it to the appropriate FIELDER chart.

The FIELDER chart used is determined by the type of out that has been made. If the type of out is a Line Drive, Ground Ball, or Sharp Ground Ball, then the INFIELDER (MINUS CATCHER) chart is used. If the type of out is a Fly Ball or Deep Fly Ball, then the OUTFIELDER chart is used, and if the type of out is a Pop-Up, then the INFIELDER WITH CATCHER chart is used.

A summary follows:

Suppose for a given at-bat, the result is an OUT on the pitcher's statistical model. The game computer then checks for the type of out and the fielder who handles the ball.

If the type of out is a Line Drive, or a Pop Up, then any runners on base will hold their respective bases. In this case, the mobile devices of each manager will display a message similar to: "Line Drive (or Pop Up) to the appropriate fielder. All runners hold" followed by the appropriate prompts to begin the next at-bat (or inning, if that was the third out).

If the type of out is a Fly Ball or a Deep Fly Ball and there is at least one runner on base (and this is not the third out), then the mobile device of the manager at bat will display a message similar to, "Fly Ball (or Deep Fly Ball) to the appropriate fielder. Do you want to try to tag up and advance (chance of your success is 67%)?"

If the manager at bat elects to try to advance, then the mobile device of the manager in the field will display a message similar to, "Fly Ball (or Deep Fly Ball) to the appropriate fielder. The appropriate runner is attempting to tag up and advance. Do you want to attempt to throw the runner out (chance of your success is 33%)?"

The manager in the field is prompted for this decision because, if there are other runners on base and they elect to try to throw one of the runners out, then the other runner automatically advances to their next base on the throw. Because of this automatic advance, the manager in the field may elect not to try to throw out the advancing runner—just to hold the other runner(s) at their respective base(s). This is particularly common if the chance of success throwing out the runner is very low or the team in the field has a large lead.

If the manager at bat elects to try to tag up and advance and the manager in the field elects to try to throw the runner out, then the game computer generates a random number and compares it to the percentage of likelihood for success. If the generated random number is less than or equal to the percentage of likelihood for success, then the runner has successfully advanced.

Notably, the STAMINA NUMBER of the pitcher is not decremented if the runner is successful in attempting to advance, unless the runner was on third base and successfully scored a run, in which case the pitcher's STAMINA NUMBER is decremented by one—for the run, not the successful advance.

Exemplary User Interface Screens

FIGS. 9 to 31 illustrate exemplary user interface screens for display on remote devices 102 and 110 that are designed to facilitate game play and enhance the experience of the manager. These screens are presented herein primarily for illustration and not by way of limitation.

Figure 9:
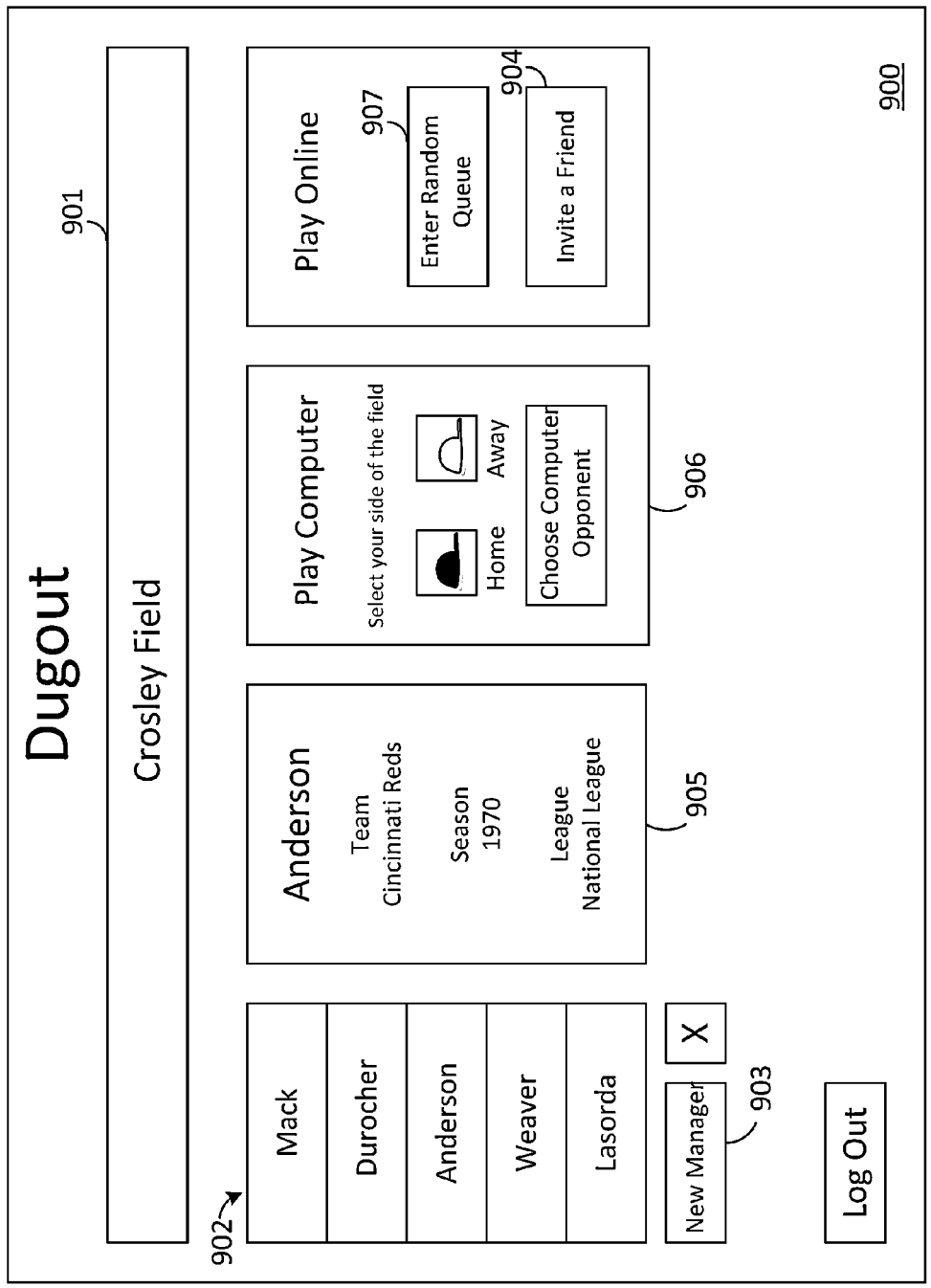
FIG. 9 shows one embodiment of a display rendered on a user interface of a remote device for prompting a user to begin game play according to the invention.

FIG. 9 shows one embodiment of a display 900 rendered on a user interface of a remote device for prompting a user to begin game play according to the invention. Display 900 (and subsequent displays) may be labeled "Dugout" as shown to indicate that its purpose is to assist the manager in pre-game setup procedures prior to the beginning of an innings-based baseball game simulation. A banner 901 may be displayed to indicate a particular historical baseball field in which the simulation will take place. In some embodiments, the choice of baseball field can affect batter and pitcher probabilities. A list of managers 902 may be provided from which the game player may select, and when selected, the game player assumes the role of the selected manager. Or, a game player may select the "New Manager" option 903 and customize the manager name and the historical team to be associated with the new manager. Display window 905 may be provided to show information associated with the selected manager. Window 906 may be provided to permit the manager to select whether to play as the home or away team, and whether to play against the computer rather than against a remote human opponent. Option 906 allows the manager to challenge a particular human opponent. Option 907 allows the manager to select a remote manager randomly from a queue of online game players.

Figure 10:
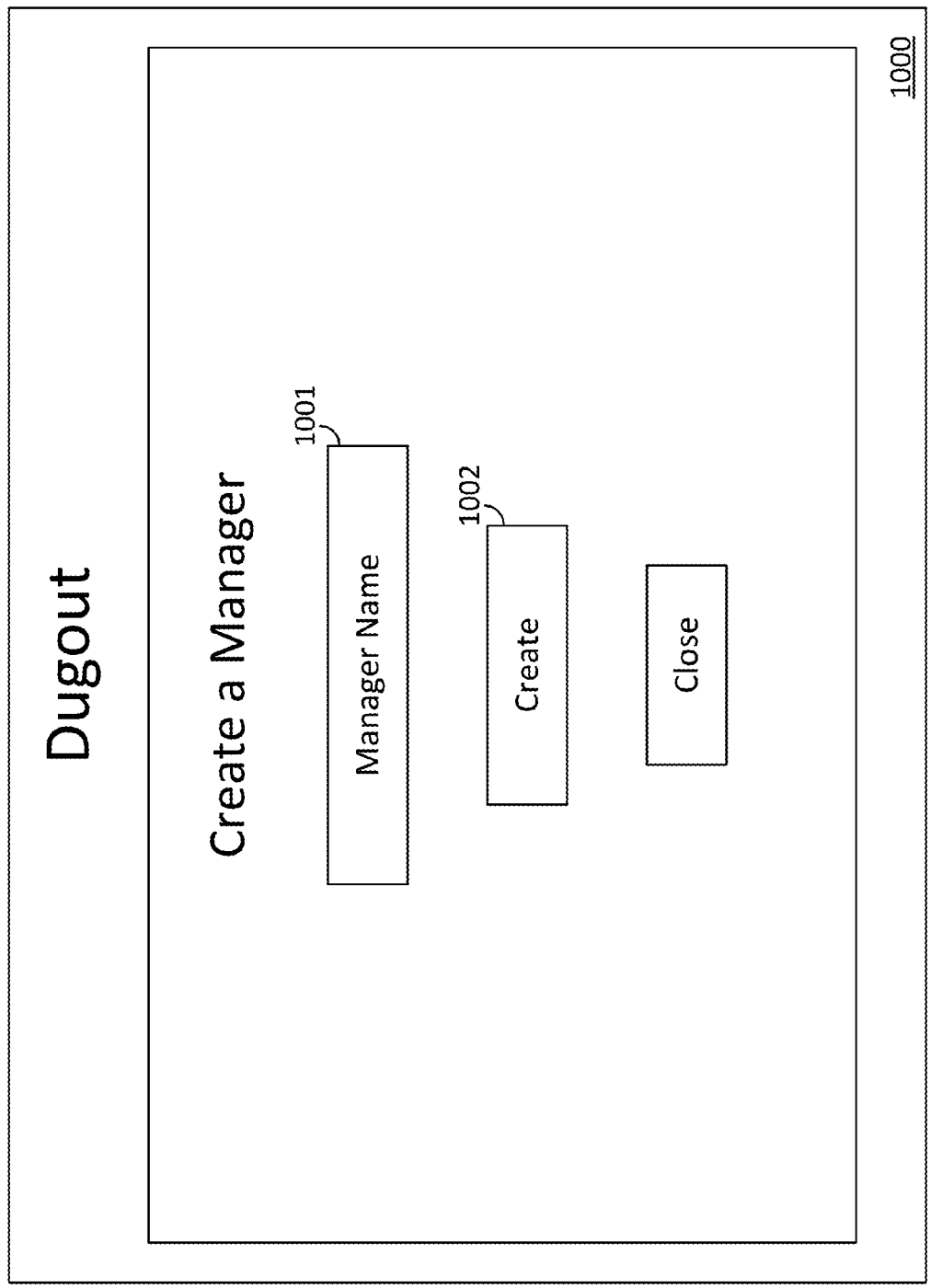
FIG. 10 shows one embodiment of a display rendered on a user interface of a remote device for prompting a user to create a manager for game play according to the invention.

FIG. 10 shows one embodiment of a display 1000 rendered on a user interface of a remote device for prompting a user to create a manager for game play according to the invention. A text field 1001 may be provided to allow entry of a customized manager name. A decision button 1002 may be provided to confirm creation of the new manager.

Figure 11:
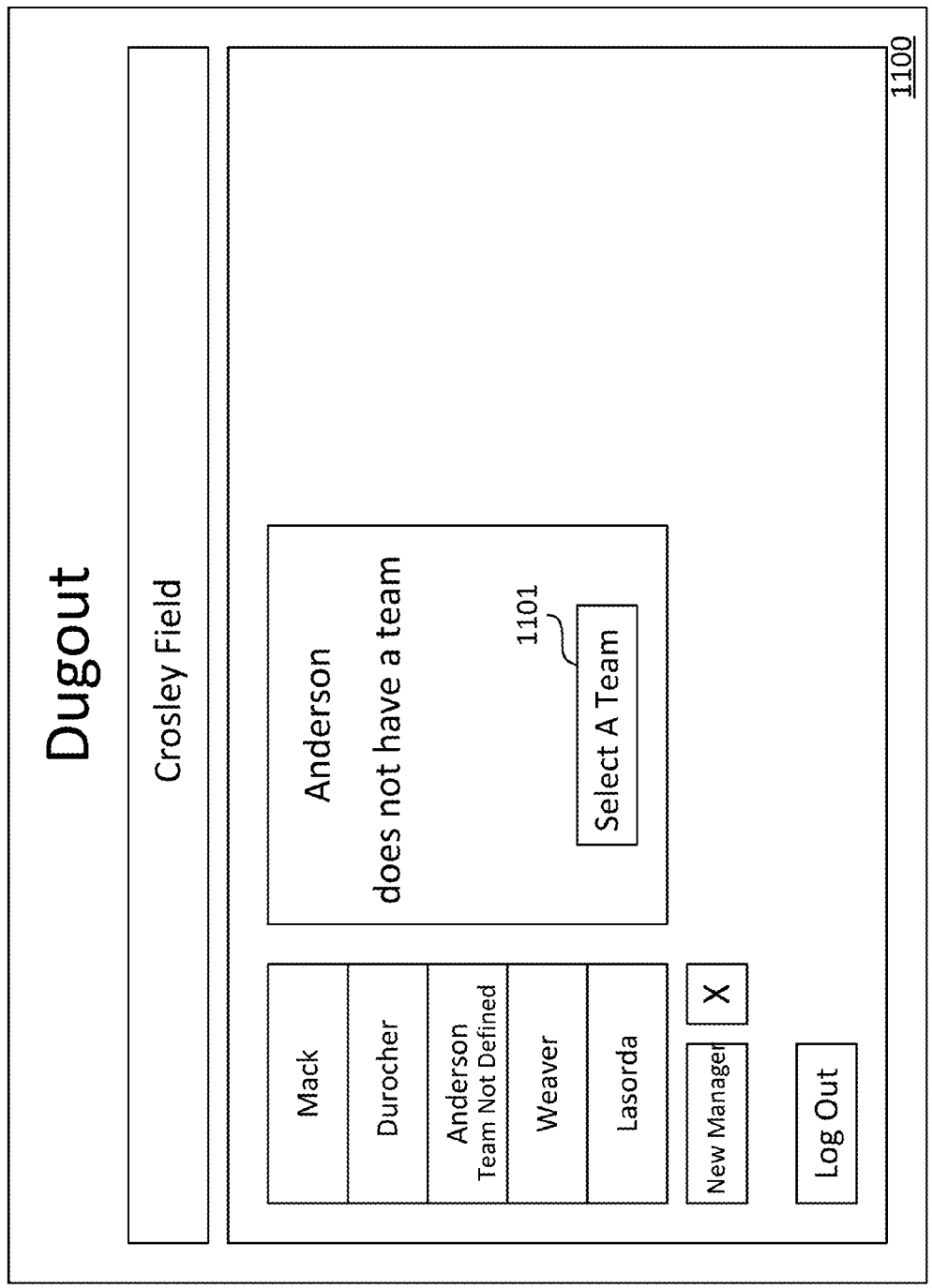
FIG. 11 shows one embodiment of a display rendered on a user interface of a remote device for prompting a user to select a team for his manager according to the invention.

FIG. 11 shows one embodiment of a display 1100 rendered on a user interface of a remote device for prompting a user to select a team for his manager according to the invention. A "Select A Team" button may be provided to allow for team selection. When selected, display such as screen 1200 may be presented on the graphical user interface.

Figure 12:
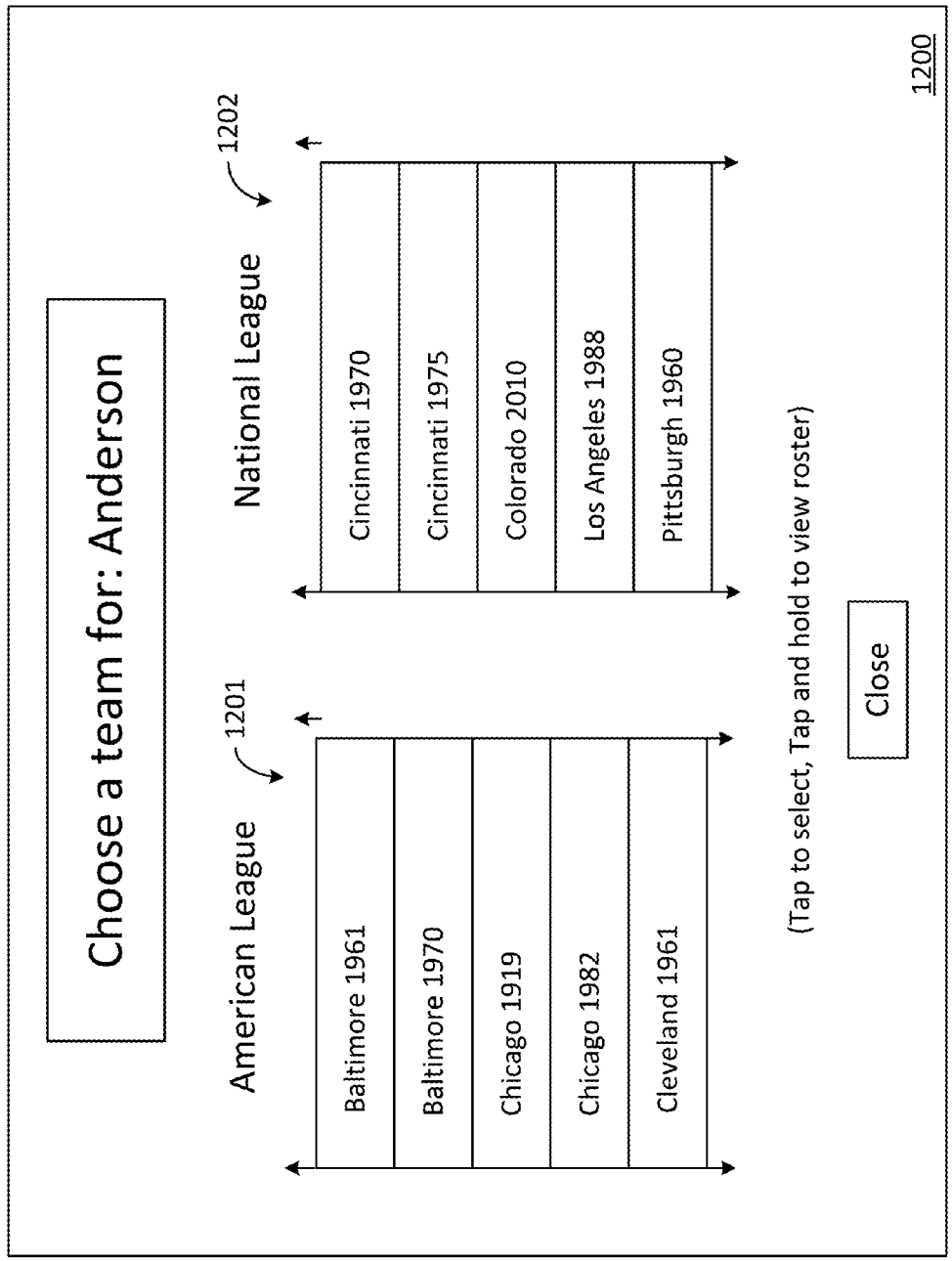
FIG. 12 shows one embodiment of a display rendered on a user interface of a remote device for listing historical baseball teams available for selection and management according to the invention.

FIG. 12 shows one embodiment of a display 1200 rendered on a user interface of a remote device for listing historical baseball teams available for selection and management according to the invention. In the example shown, two lists are provided from which the game player may select a team for association with the newly created manager. List 1201 contains selectable and scrollable buttons that each represent an historical American League team. List 1202 contains selectable and scrollable buttons that each represent an historical National League team.

Figure 13:
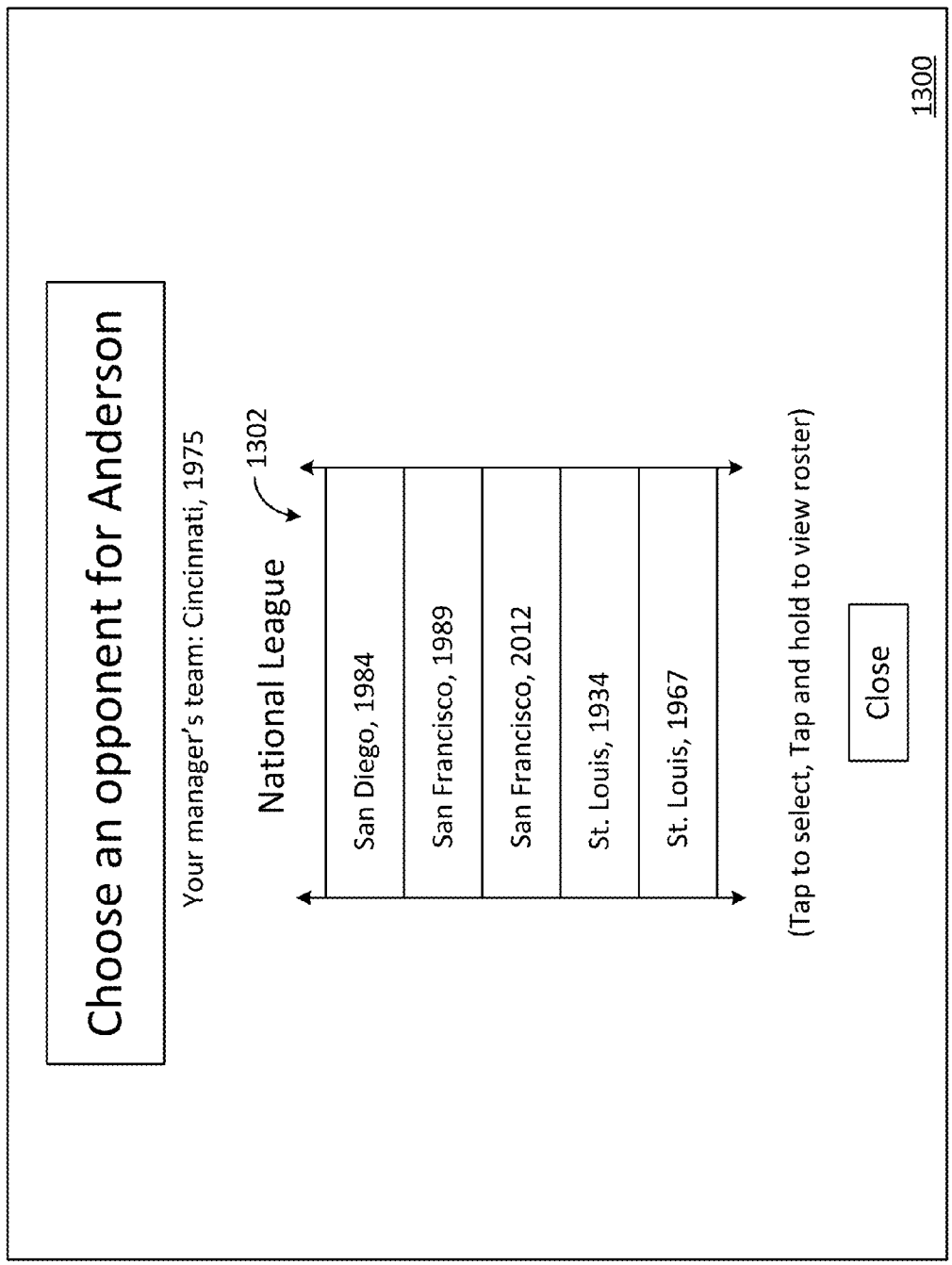
FIG. 13 shows one embodiment of a display rendered on a user interface of a remote device for listing historical baseball teams available for selection as an opponent in a one-player game according to the invention.

FIG. 13 shows one embodiment of a display 1300 rendered on a user interface of a remote device for listing historical baseball teams available for selection as an opponent in a one-player game according to the invention. This screen may be displayed in the event that a game player elects to play against the computer. As shown, a single list 1302 may be displayed that corresponds to the league in which the new manager has chosen to manage. In other embodiments, inter-league opponents may also be selected.

Figure 14:
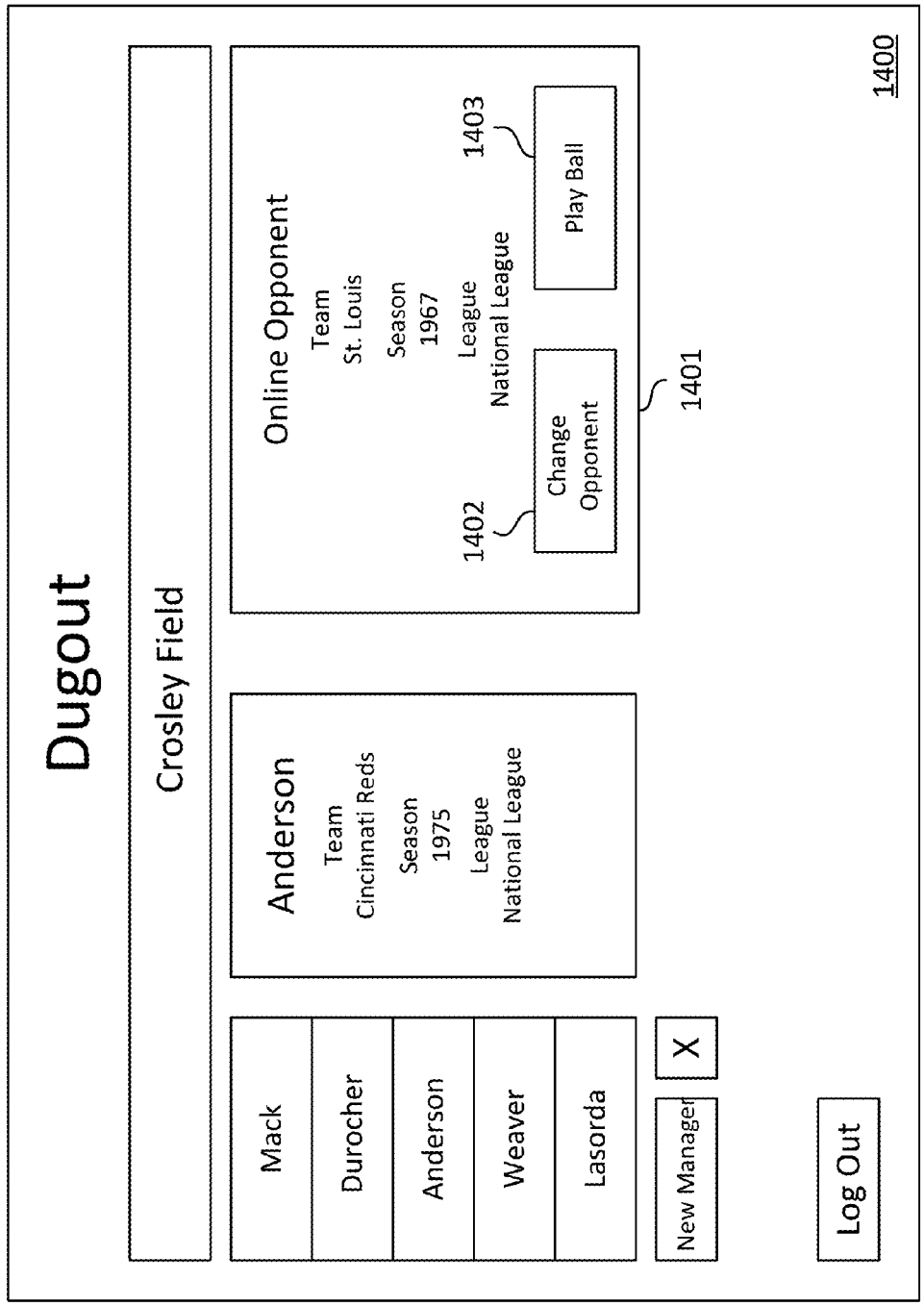
FIG. 14 shows one embodiment of a display rendered on a user interface of a remote device, showing opposing teams selected for playing a simulated baseball game and a prompt for starting the game, according to one embodiment of the invention.

FIG. 14 shows one embodiment of a display 1400 rendered on a user interface of a remote device, showing opposing teams selected for playing a simulated baseball game and a prompt for starting the game, according to one embodiment of the invention. Window 1401 may be provided to present a summary of the selected opponent. In this example, the selected opponent is an online opponent. Button 1402 may be provided to allow the game player to change the selection. Button 1403 "Play Ball" may be provided to launch a game of Simulated Baseball according to the invention described herein.

Figure 15:
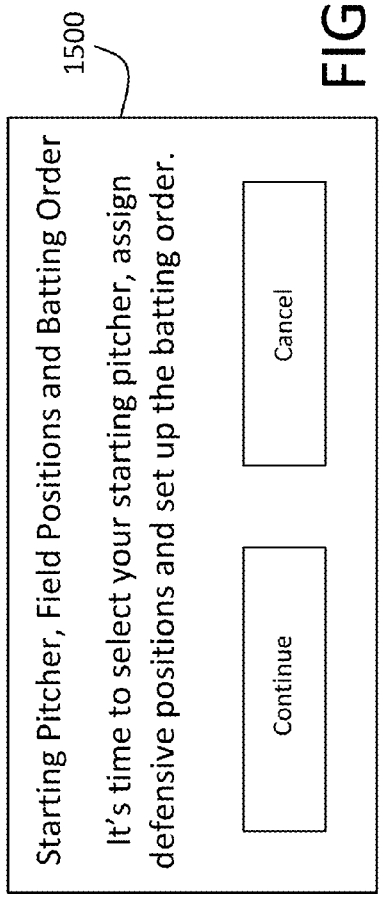
FIG. 15 shows one example of a display rendered on a user interface for prompting a manager to construct a lineup for game play according to the invention.

FIG. 15 shows one example of a display 1500 rendered on a user interface for prompting a manager to construct a lineup for game play according to the invention. Display 1500 may be a popup window that prompts a manager to continue (1501) or cancel (1502) the game.

FIG. 16 shows one example of a display 1600 rendered on a user interface for prompting a manager to select a starting pitcher from a list of pitchers available for game play according to the invention. Pitcher names are shown in column 1602. The role of each pitcher, i.e., whether a starting pitcher, a relief pitcher, or a special pitcher (who may be deployed as either a starter or a reliever) is shown in column 1604. The pitcher's control rating is shown in column 1601. The pitcher's stamina rating is shown in column 1603. Columns 1605 to the right of column 1603 list the frequency of occurrences of the various outcomes in a corresponding set of pitcher probabilities—i.e., the number of Hits, Passed Balls (PB), Strikeouts (Ks), Home Runs (HRs), Wild Pitches (WPs), Hit Batsmen (HBP), Base on Balls (BBs) and Outs. The Next button 1606, in this and in subsequent screens, allows the manager to advance to the next screen.

FIG. 17 shows one example of a display 1700 rendered on a user interface for prompting a manager to select position players from a scrollable list of players available for game play according to the invention. The scrollable list may be displayed in the form of a table that shows columns for player name 1702, team 1704, season 1706, and defensive ratings for up to five defensive positions (or some other number of defensive positions) in columns 1701, 1703, 1705, 707 and 1709. At the far right, a column 1708 is provided to indicate whether each player has been assigned to a defensive position. The defensive positions are shown at the bottom of display 1700 as selection boxes. On this user interface screen, a manager may highlight a player row, and then select a selection box corresponding to a defensive position that the player is qualified to play. Position qualification may be determined according to historical major league baseball records. Note that the pitcher selection box "P" is already selected because a starting pitcher has already been selected in a previous user interface screen. An optional "Auto Set" button 1710 may be selected that will cause the remote device to automatically assign players to appropriate defensive positions. A "Profiles" button 1711 allows a manager to select saved defensive lineups, and a "Save" button 1712 allows a manager to save a defensive lineup as a profile for later recall.

Figure 18:
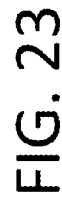
FIG. 18 shows one example of a display rendered on a user interface for prompting a manager to assign a player to a defensive position from a list of positions at which the player qualifies in game play according to the invention.

FIG. 18 shows one example of a display 1800 rendered on a user interface for prompting a manager to assign a player to a defensive position from a list of positions at which the player qualifies in game play according to the invention. Display 1800 may be a popup window that presents all possible defensive positions which a selected player is qualified to play. For example, George Foster in 1975 is qualified to play all outfield positions, and selection buttons may be provided for each—left field 1801, center field 1802, and right field 1803.

FIG. 19 shows one example of a display 1900 rendered on a user interface for prompting a manager to create a batting order from players selected for the starting lineup in game play according to the invention. To assist the manager in constructing the batting order, the opposing pitcher's statistics may be provided at the top of the screen in a table 1902. Beneath that table, a scrollable table of the players assigned to the starting lineup is displayed, along with the various batter ratings. In particular, batter ratings associated with strategy options for Baserunning (1901), Speed (1903), Bat Control (1905), and Clutch Batting (1907) are shown to the right of each player name. Further to the right, the scrollable table lists the frequency of occurrences of the various outcomes in a corresponding set of batter probabilities—i.e., the number of Singles (1Bs), Doubles (2Bs), Triples (3Bs), Home Runs (HRs), Strikeouts (Ks), Walks (BBs), Hit-By-Pitches (HBPs), and Outs. Auto Set, Profiles, Save, and Next buttons may also be provided, as shown, having functions similar to those previously described. Selection boxes 1 to 9 are provided at the lower left portion of the screen 1900 to assign players to positions in the batting order in a manner similar to that described in the context of screen 1700.

FIG. 20 shows one example of a display 2000 rendered on for a user interface for providing a manager with confirmation of lineup selections prior to commencing game play according to the invention. Display 2000 may present the selected lineups for both teams in tabular form. As shown, the Away Team is summarized in table 2001 and the Home Team is summarized in Table 2002. Each of these tables may include player names and their associated strategy ratings and defensive ratings, as shown. A "Play Ball" button may be provided to advance the game simulation from pre-game setup ("Dugout") functions to simulated baseball play.

Figure 21:
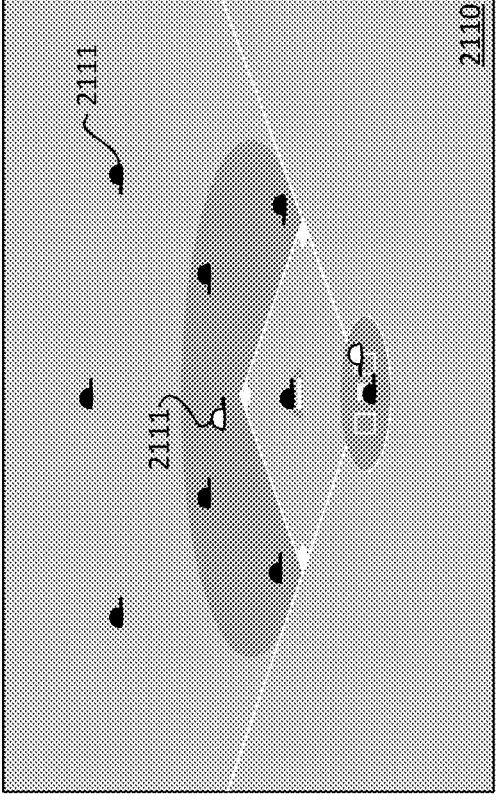
FIG. 21 shows one example of a display rendered on a user interface for presenting game status and defensive strategy options according to the invention.

FIG. 21 shows one example of a display 2100 rendered on a user interface for presenting game status and defensive strategy options according to the invention. In a preferred embodiment, display 2100 serves as a main screen that functions as a scoreboard and remains rendered for the duration of the simulation. Game updates that result from pitcher/batter engagements and other events are typically displayed on main screen 2100. A field area 2110 occupies the center of the display, and preferably shows a layout of the baseball field including icons 2111 that represent players active in the simulation. A scoreboard 2112, showing a conventional baseball game box score, may be displayed above the field area. A message area 2113 between the scoreboard and field area may be provided to alert managers to current status and options happening in the game. Pitcher statistics for the current pitcher may be presented in a pitcher window 2114 in the upper left. Pitcher statistics may include loves-to-face/hates-to-face data 2102, Control Rating, and beginning Stamina, as well as a Stamina Bar 2105 that indicates the pitcher's remaining stamina points. Batter statistics for the player at bat may be presented in a batter window 2115 in the upper right, and may include loves-to-face/hates-to-face data 2103 for the batter, as well as other statistics relevant to strategy options. Lineups in tabular form 2116, 2117 may be shown on the right (Away Team) and left (Home Team) sides of the field area 2110, respectively. A selection bar 2118 is provided below the field area 2110 to present strategy options for the defensive manager. These options include buttons to effect Pitch to the Batter, Intentional Walk, Defensive Substitution, Relief Pitcher, and Double Switch Options. The Double Switch option allows the defensive manager replace a pitcher and one other position player while swapping their positions in the batting order.

Figure 22:
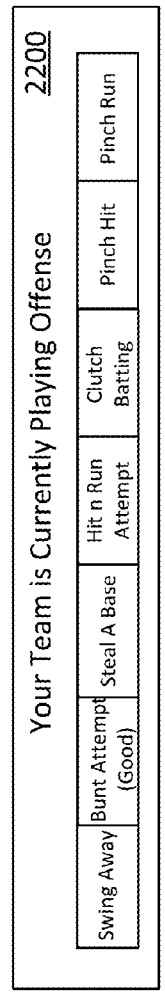
FIG. 22 shows one example of a display rendered on a user interface for presenting offensive strategy options according to the invention.

FIG. 22 shows one example of a display 2200 rendered on a user interface for presenting offensive strategy options according to the invention. These options—Swing Away, Bunt Attempt, Steal A Base, Hit n Run Attempt, Clutch Batting, Pinch Hit, and Pinch Run—the functions of which are described above, appear as selectable buttons for the offensive manager in the same area of the user interface display occupied by the display 2100.

Figure 23:
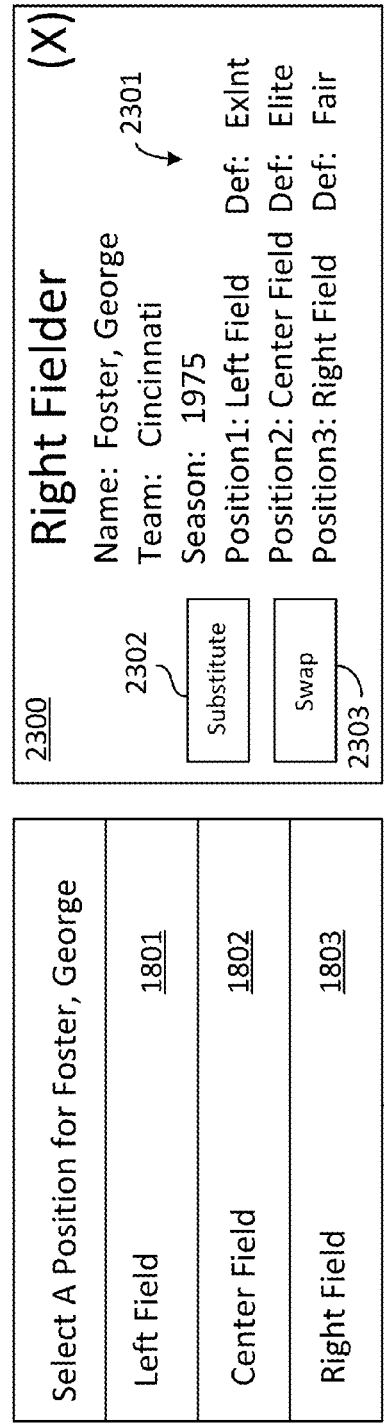
FIG. 23 shows one example of a display rendered on a user interface for presenting player attributes with strategy options according to the invention.

FIG. 23 shows one example of a display 2300 rendered on a user interface for presenting player attributes with strategy options according to the invention. Display 2300 may appear as a popup window, for example, responsive to a manager selecting a player icon 2111 from the field area 2110. In this example, a defensive player's icon has been selected, so that the display window 2300 presents defensive data 2301 and defensive options 2302 and 2303 for the defensive manager. By selecting button 2302, the manager may effect a defensive substitution and replace the player with another qualified player from the bench. Or, by selecting button 2303, the manager may swap this player's assigned defensive position with that of another player currently in the game.

FIG. 24 shows one example of a display 2400 rendered on a user interface for presenting an event outcome with defensive strategy options according to the invention. In this particular popup display, an outcome of a pitcher/batter engagement (Sharp Ground Ball to Shortstop) is presented at the top of the screen. Below this are displayed strategy options for the defensive manager in the form a selectable buttons, to enable the defensive manager to interact by either trying to complete a double play 2401, or to elect to take only one out in a single play 2402. The chance of success of a strategy option may also be displayed within a selection button, as shown.

FIG. 25 shows one example of a display 2500 rendered on a user interface for presenting a game status with defensive strategy options according to the invention. This particular strategy option is presented as a popup window that reports game status, i.e. "Runner At Third and Less Than 2 Outs", and prompts the defensive manager to "Set Defensive Stance". The manager is presented with options in the form of selectable buttons 2501, 2502 to either play the infield "IN" to cut off a runner attempting to score from third base, or to play the infield "BACK" for a possible double play or improved chance of recording an out on a ground ball.

FIG. 26 shows one another example of a display 2600 rendered on a user interface for presenting an event outcome with offensive strategy options according to the invention. In this display, an engagement outcome is presented at the top ("Deep Fly Ball to Left Field—Score from Third?") and selection buttons 2601, 2602 provide the offensive manager with options to either tag up and try to score, or keep the runner at third. The chance of success of a strategy option may also be displayed within a selection button, as shown.

FIGS. 27-30 each show various examples of displays rendered on a user interface of a remote device for presenting pitcher/batter event outcomes to managers according to the invention. These event outcome displays may appear, for example, within the message area 2113 of the main screen display 2100.

FIG. 31 shows one example of a display 3100 rendered on a user interface of a remote device for presenting final results of a baseball simulation game according to the invention. In this example, a conventional summary of runs, hits, and errors is shown in box score form. In other embodiments, a final results display may include player statistics and other box score data familiar to baseball fans, or may highlight record performances, list a Star of the Game, Clutch Batter, Winning Pitcher, etc. Additionally, the final results window may prompt the managers for a rematch.

As described herein, the terms "component", "module", "system", "computer" and the like each refer to a computer-related entity, either hardware, firmware, a combination of hardware and software, software, or software in execution. For example, a module can be, but is not limited to being, a process running on a processor, a processor, an object, an executable, a script, a thread of execution, a program, or a computer. By way of illustration, both an application running on a computing device and the computing device itself may comprise a module. One or more modules can reside within a process or thread of execution and a module can be localized on one computer or distributed between two or more computers. In addition, these modules can execute from various computer readable media having various data structures stored thereon. The computer readable media may be transitory or non-transitory. The modules can communicate by way of local or remote processes such as in accordance with a signal having one or more data packets, e.g. data from one component interacting with another component in a local system, distributed system, or across a network with other systems by way of the signal.

Those skilled in the art will appreciate that the various illustrative logical blocks, modules, circuits, methods, and algorithms described in connection with the examples disclosed herein may be implemented as electronic hardware, computer software, or combinations of both. To clearly illustrate this interchangeability of hardware and software, various illustrative components, blocks, modules, circuits, methods, and algorithms have been described above generally in terms of their functionality. Whether such functionality is implemented as hardware or software depends upon the particular application and design constraints imposed on the overall system. Implementations in software may be effected using conventional programming languages using code that achieves the requirements of the foregoing specification.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. On a computer network having a server communicating with remote computers, a method for simulating a game of baseball playable by users at the remote computers, the method comprising the following steps executed at the server:
    (a) receiving user-selected pitcher data and a pitcher control value from a first one of the remote computers;
    (b) receiving, for an engagement between pitcher and batter, user-selected batter data via the computer network from a second one of the remote computers;
    (c) modifying the pitcher control value according to one or more of (i) the user-selected batter data, (ii) the user-selected pitcher data, and (iii) a status of the game;
    (d) generating a first random number;
    (e) comparing the first random number to the modified pitcher control value;
    (f) if the first random number is not greater than the modified pitcher control value, selecting a set of pitcher probabilities representing possible outcomes of the engagement;
    (g) if the first random number is greater than the modified pitcher control value, selecting a set of batter probabilities representing possible outcomes of the engagement;
    (h) generating a second random number;
    (i) determining an outcome of the engagement by comparing the second random number to the selected set of probabilities; and
        (j) transmitting instructions to the first and second remote computers for updating status of the game on a visual display according to the outcome of the engagement.

2. The method of claim 1 wherein the steps are encoded as a series of instructions stored in memory and executable by a processor within the server.

3. The method of claim 1 wherein the modifying step generates the modified pitcher control value as a value selected from the group comprising a lower value, and equal value, and a higher value.

4. The method of claim 3 wherein the lower value is generated if the selected pitcher data indicates a hates-to-face relationship with respect to the selected batter data.

5. The method of claim 3 wherein the higher value is generated if the selected pitcher data indicates a loves-to-face relationship with respect to the selected batter data.

6. The method of claim 1 further comprising
    determining, prior to the modifying step, whether a manager strategy option has been received from at least one of the remote computers; and if so,
    bypassing steps (d) through (i); and
    resolving the manager strategy option prior to step (j).

7. The method of claim 6 wherein the manager strategy option comprises an intentional walk command received from the first remote computer, and wherein the resolving step comprises advancing a batter to first base.

8. The method of claim 6 wherein the manager strategy option comprises a stolen base attempt, and wherein resolving the manager strategy option further comprises:
- receiving catcher defensive data via the computer network from the first remote computer;
- receiving baserunning and speed data via the computer network from the second remote computer;
- determining a set of base stealing probabilities for resolving the stolen base attempt based on the retrieved catcher defensive data and on the retrieved baserunning and speed data;
- generating a third random number; and
- determining the outcome of the stolen base attempt by comparing the third random number to the set of base stealing probabilities.

9. The method of claim 6 wherein the manager strategy option comprises a hit-and-run attempt, and wherein resolving the manager strategy option further comprises:
- receiving bat control data and speed data via the computer network from the second remote computer;
- determining a set of hit-and-run probabilities for resolving the hit-and-run attempt based on the retrieved bat control data;
- generating a fourth random number; and
- determining the outcome of the hit-and-run attempt by comparing the fourth random number and the speed data to the set of hit-and-run probabilities.

10. The method of claim 6 wherein the manager strategy option comprises a clutch batting attempt, and wherein resolving the manager strategy option further comprises:
- receiving clutch batting data via the computer network from the second remote computer;
- determining a set of clutch batting probabilities for resolving the clutch batting attempt based on the retrieved clutch batting data;
- generating a fifth random number; and
- determining the outcome of the clutch batting attempt by comparing the fifth random number to the set of clutch batting probabilities.

11. A special purpose computer for simulating a game of baseball playable by users communicating remotely with the special purpose computer from remote computers, the special purpose computer comprising means for:
- (a) receiving user-selected pitcher data and a pitcher control value from a first one of the remote computers;
- (b) receiving, for an engagement between pitcher and batter, user-selected batter data from a second one of the remote computers;
- (c) modifying the pitcher control value according to one or more of (i) the user-selected batter data, (ii) the user-selected pitcher data, and (iii) a status of the game;
- (d) generating a first random number;
- (e) comparing the first random number to the modified pitcher control value;
- (f) if the first random number is not greater than the modified pitcher control value, selecting a set of pitcher probabilities representing possible outcomes of the engagement;
- (g) if the first random number is greater than the modified pitcher control value, selecting a set of batter probabilities representing possible outcomes of the engagement;
- (h) generating a second random number;
- (i) determining an outcome of the engagement by comparing the second random number to the selected set of probabilities; and
- (j) transmitting instructions to the first and second remote computers for updating status of the game on a visual display according to the outcome of the engagement.

12. The computer of claim 11 wherein the means for modifying the pitcher control value comprises executing an algorithm for lowering the pitcher control value if the user-selected batter data includes a hit-and-run attempt or a clutch batting attempt.

13. The computer of claim 11 wherein the means for modifying the pitcher control value comprises executing an algorithm for lowering the pitcher control value if the user-selected pitcher data indicates a hates-to-face relationship with respect to the user-selected batter data.

14. The computer of claim 11 wherein the means for modifying the pitcher control value comprises executing an algorithm for raising the pitcher control value if the user-selected pitcher data indicates a loves-to-face relationship with respect to the user-selected batter data.

15. The computer of claim 11 wherein the means for modifying the pitcher control value comprises executing an algorithm for raising the pitcher control value if the status of the game indicates that a pitcher has reached a final stamina point.

16. A non-transitory computer readable medium coupled to a processor of a special purpose computer and encoded with instructions for simulating a game of baseball playable by users communicating remotely with the special purpose computer from remote computers, the special purpose computer dedicated to executing, by means of the processor, simulation instructions comprising:
- a) receiving user-selected pitcher data and a pitcher control value from a first one of the remote computers;
- (b) receiving, for an engagement between pitcher and batter, user-selected batter data from a second one of the remote computers;
- (c) modifying the pitcher control value according to one or more of (i) the user-selected batter data, (ii) the user-selected pitcher data, and (iii) a status of the game;
- (d) generating a first random number;
- (e) comparing the first random number to the modified pitcher control value;
- (f) if the first random number is not greater than the modified pitcher control value, selecting a set of pitcher probabilities representing possible outcomes of the engagement;
- (g) if the first random number is greater than the modified pitcher control value, selecting a set of batter probabilities representing possible outcomes of the engagement;
- (h) generating a second random number;
- (i) determining an outcome of the engagement by comparing the second random number to the selected set of probabilities; and
- (j) transmitting instructions to the first and second remote computers for updating the status of the game on a visual display according to the outcome of the engagement.

17. The non-transitory computer readable medium of claim 16 wherein the instruction for modifying the pitcher control value comprises executing an algorithm for lowering the pitcher control value if the user-selected batter data includes a hit-and-run attempt or a clutch batting attempt.

18. The non-transitory computer readable medium of claim 16 wherein the instruction for modifying the pitcher control value comprises executing an algorithm for lowering the pitcher control value if the user-selected pitcher data indicates a hates-to-face relationship with respect to the user-selected batter data.

19. The non-transitory computer readable medium of claim 16 wherein the instruction for modifying the pitcher control value comprises executing an algorithm for raising the pitcher control value if the user-selected pitcher data indicates a loves-to-face relationship with respect to the user-selected batter data.

20. The non-transitory computer readable medium of claim 16 wherein the instruction for modifying the pitcher control value comprises executing an algorithm for raising the pitcher control value if the status of the game indicates that a pitcher has reached a final stamina point.

* * * * *